United States Patent
Niu et al.

(10) Patent No.: US 11,330,578 B2
(45) Date of Patent: May 10, 2022

(54) UPLINK CARRIER CONFIGURATION

(71) Applicant: ZTE Corporation, Guangdong (CN)

(72) Inventors: Li Niu, Guangdong (CN); Yajun Zhao, Guangdong (CN)

(73) Assignee: ZTE Corporation, Guangdong (CN)

(*) Notice: Subject to any disclaimer, the term of this patent is extended or adjusted under 35 U.S.C. 154(b) by 105 days.

(21) Appl. No.: 16/746,586

(22) Filed: Jan. 17, 2020

(65) Prior Publication Data
US 2020/0154421 A1    May 14, 2020

Related U.S. Application Data

(63) Continuation of application No. PCT/CN2017/093758, filed on Jul. 20, 2017.

(51) Int. Cl.
*H04W 72/04* (2009.01)
*H04W 74/08* (2009.01)

(52) U.S. Cl.
CPC ..... *H04W 72/042* (2013.01); *H04W 74/0833* (2013.01)

(58) Field of Classification Search
CPC . H04W 72/082; H04W 52/143; H04W 16/14; H04W 24/023; H04W 52/243
See application file for complete search history.

(56) References Cited

U.S. PATENT DOCUMENTS

| | | | |
|---|---|---|---|
| 2013/0188580 A1* | 7/2013 | Dinan | H04W 74/085 370/329 |
| 2013/0188620 A1 | 7/2013 | Dinan | |
| 2015/0181470 A1* | 6/2015 | Chai | H04W 36/08 455/438 |
| 2015/0359037 A1 | 12/2015 | Lee et al. | |
| 2015/0373600 A1* | 12/2015 | Malkamaki | H04W 36/0077 370/331 |
| 2016/0374032 A1 | 12/2016 | Kim et al. | |
| 2017/0055187 A1* | 2/2017 | Kang | H04W 36/0058 |
| 2018/0255487 A1* | 9/2018 | Chai | H04W 36/18 |
| 2018/0332520 A1* | 11/2018 | Cheng | H04W 36/0016 |
| 2019/0098592 A1* | 3/2019 | Lohr | H04W 76/14 |
| 2019/0357069 A1* | 11/2019 | Harada | H04W 24/10 |

(Continued)

FOREIGN PATENT DOCUMENTS

| | | |
|---|---|---|
| CN | 101772181 A | 7/2010 |
| CN | 101772182 A | 7/2010 |
| CN | 102577488 A | 7/2012 |

(Continued)

OTHER PUBLICATIONS

First Office Action for Chinese Application No. 201780093239. X, dated Mar. 24, 2021, 14 pages (with English Summary).

(Continued)

*Primary Examiner* — Chi Ho A Lee
(74) *Attorney, Agent, or Firm* — Perkins Coie LLP

(57) ABSTRACT

One or more devices, systems, and/or methods for facilitating transmission of a configuration corresponding to an uplink carrier are provided. The configuration may be transmitted to a node. The configuration may be used to identify the uplink carrier. The node may access the uplink carrier responsive to receiving an add instruction. The node may release the uplink carrier responsive to receiving a delete instruction.

16 Claims, 21 Drawing Sheets

(56) References Cited

U.S. PATENT DOCUMENTS

2020/0029259 A1* 1/2020 Yiu .................... H04W 74/008
2021/0014032 A1* 1/2021 Loehr ............... H04W 72/0446

FOREIGN PATENT DOCUMENTS

| CN | 105493618 A | 4/2016 |
|----|-------------|--------|
| WO | 2010104290 A2 | 9/2010 |
| WO | 2016/105175 A1 | 6/2016 |

OTHER PUBLICATIONS

International Search Report and Written Opinion dated Mar. 28, 2018 for International Application No. PCT/CN2017/093758, filed on Jul. 20, 2017 (7 pages).

\* cited by examiner

UPLINK CARRIER CONFIGURATION

CROSS REFERENCE TO RELATED APPLICATIONS

This patent document is a continuation of and claims benefit of priority to International Patent Application No. PCT/CN2017/093758, filed on Jul. 20, 2017. The entire content of the before-mentioned patent application is incorporated by reference as part of the disclosure of this application.

BACKGROUND

A communication link between wireless nodes, such as between a user equipment (UE) and a base station (BS), may be facilitated using one or more uplink carriers. For example, the UE may access an uplink carrier and use the uplink carrier to transmit data to and/or through the BS. However, the UE may need to use one or more different uplink carriers due to changes in a service demand and/or a location of the UE.

SUMMARY

In accordance with the present disclosure, one or more devices and/or methods for facilitating transmission of a configuration are provided. In an example, a configuration corresponding to an uplink carrier may be generated. The configuration may be transmitted to a node.

In an example, an activation instruction corresponding to an uplink carrier may be generated. The activation instruction may be transmitted to a node.

In an example, a deactivation instruction corresponding to an uplink carrier may be generated. The deactivation instruction may be transmitted to a node.

In an example, a configuration corresponding to an uplink carrier may be received from a node. The uplink carrier may be identified using the configuration.

In an example, an activation instruction corresponding to an uplink carrier may be received from a node. The uplink carrier may be activated based upon the activation instruction.

In an example, a deactivation instruction corresponding to an uplink carrier may be received from a node. The uplink carrier may be deactivated based upon the deactivation instruction.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

One or more computing devices and/or techniques for facilitating access to one or more uplink carriers and/or release of the one or more uplink carriers are provided. For example, a user equipment (UE) may connect to a (e.g., wireless communication) network via a base station (BS) of the network. The UE may use one or more uplink carriers for data transmission to the BS and/or the network. However, the UE may need to cease using one or more uplink carriers for data transmission and/or may need to (e.g., begin) using one or more different uplink carriers due to changes in a service demand and/or a location of the UE. Thus, the UE may receive one or more configurations. The one or more configurations may comprise one or more cell configurations comprising a primary cell configuration and/or one or more secondary cell configurations. A primary cell corresponding to the primary cell configuration may be used to receive and/or send (e.g., secure) parameters and/or non-access stratum (NAS) mobility features. One or more secondary cells corresponding to the one or more secondary cell configurations may be used to provide data service for the UE. One or more cells corresponding to the one or more cell configurations may comprise one or more uplink carriers. The one or more cells may comprise fewer uplink carriers than downlink carriers, and systems that may use an uplink frequency band more than downlink frequency bands may be limited with (e.g., low) data rates, efficiency, etc. Thus, in accordance with one or more of the techniques presented herein, the one or more cells may comprise fewer downlink carriers than uplink carriers. The UE may access (e.g., identify, use, communicate via, etc.) the one or more uplink carriers based upon the one or more configurations and/or one or more add instructions. The UE may release (e.g., information of) the one or more uplink carriers based upon the one or more configurations and/or one or more delete instructions.

Figure 1A:
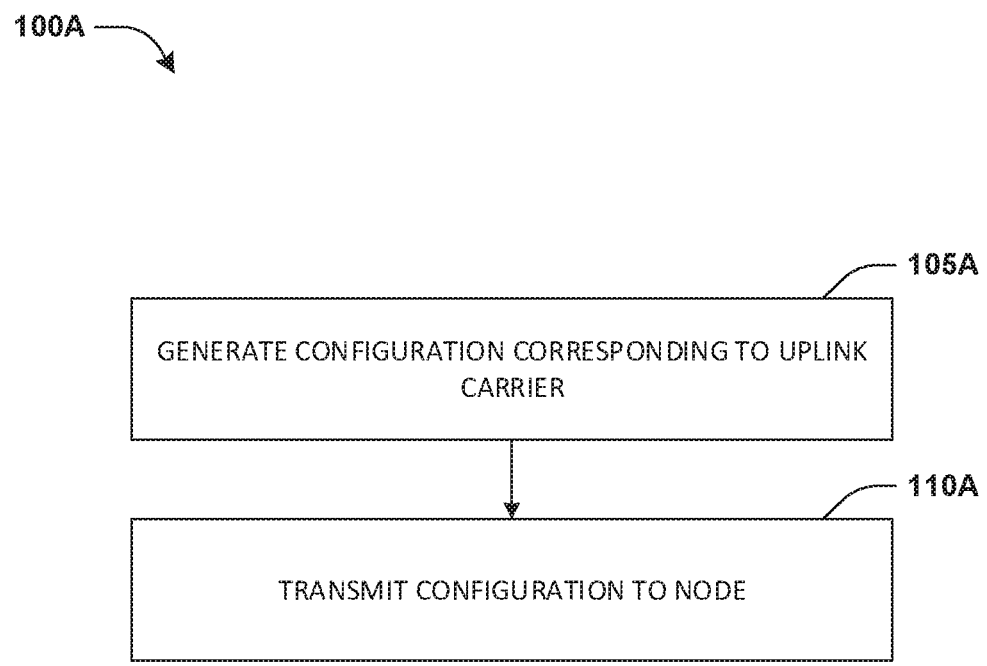
FIG. 1A is a flow chart illustrating an example method for facilitating transmission of a configuration.

An example 100A of facilitating transmission of a configuration from a first wireless node to a second wireless node is illustrated in FIG. 1A. The first wireless node may be a network and/or BS and the second wireless node may be a UE. The second wireless node may (e.g., be required to) transmit one or more data packets to the first wireless node using an uplink carrier. Accordingly, at 105A, the first wireless node may generate a configuration corresponding to the uplink carrier. In some examples, the configuration corresponding to the uplink carrier may not correspond to (e.g., not include) a downlink carrier.

The uplink carrier may be associated with (e.g., comprise) an uplink resource, a random access resource, a sounding reference symbol (SRS) resource, a physical uplink shared channel (PUSCH) resource, an uplink power control parameter, a physical uplink control channel (PUCCH) configuration and/or other information. In some examples, the uplink carrier may be associated with (e.g., comprise) an identification. Accordingly, the configuration may comprise information corresponding to the uplink carrier. In some examples, the second wireless node may identify (e.g., locate, recognize, indicate, etc.) the uplink carrier using the information. The information may comprise random access resource information, antenna information, an SRS configuration, a PUSCH configuration, the uplink power control parameter, a channel quality indicator (CQI), channel information, identification information, an uplink frequency, an uplink bandwidth, an uplink public resource, a terminal proprietary resource, a quality indicator configuration, timing advance group (TAG) information and/or other information. In some examples, at 110A, the first wireless node may transmit the configuration (e.g., comprising the information) to the second wireless node.

The uplink carrier may serve as (e.g., be used by the second wireless node as) a secondary uplink carrier associated with a primary cell. In some examples, the uplink carrier and/or (e.g., a second uplink carrier of) the primary cell may be used for data transmission from the second wireless node to the first wireless node (e.g., and/or one or more other wireless nodes).

The uplink carrier may be used for data transmission based upon a service demand of the second wireless node and/or a location of the second wireless node. Accordingly, the first wireless node may generate an add instruction corresponding to the uplink carrier based upon the service demand of the second wireless node and/or the location of the second wireless node. The add instruction may be configured to instruct the second wireless node to access (e.g., identify, use, communicate via, etc.) the uplink carrier (e.g., for data transmission). In some examples, the add instruction may be comprised within (e.g., and/or transmitted to the second wireless node within) the configuration. Alternatively and/or additionally, the add instruction may not be comprised within (e.g., and/or transmitted to the second wireless node within) the configuration.

Alternatively and/or additionally, the uplink carrier may not (e.g., and/or may cease to) be used for data transmission based upon the service demand of the second wireless node and/or the location of the second wireless node. Accordingly, the first wireless node may generate a delete instruction corresponding to the uplink carrier based upon the service demand of the second wireless node and/or the location of the second wireless node. The delete instruction may be configured to instruct the second wireless node to release (e.g., information of) the uplink carrier (e.g., and/or not use the uplink carrier for data transmission). In some examples, the delete instruction may be comprised within (e.g., and/or transmitted to the second wireless node within) the configuration. Alternatively and/or additionally, the delete instruction may not be comprised within (e.g., and/or transmitted to the second wireless node within) the configuration. In some examples, the delete instruction may comprise information corresponding to the uplink carrier. The information may be used by the second wireless node to identify (e.g., locate, recognize, indicate, etc.) and/or release (e.g., information of) the uplink carrier. For example, the information may comprise the uplink frequency, an index associated with the uplink carrier and/or other information. In some examples, the information comprises an RRCConnectionReconfiguration message corresponding to the uplink carrier.

In some examples, the configuration corresponding to the uplink carrier may comprise a secondary cell configuration corresponding to a secondary cell. The secondary cell may comprise the uplink carrier. In some examples, the secondary cell may not comprise a downlink carrier. The secondary cell may be associated with (e.g., comprise) a cell identification, an uplink resource, a random access resource, an SRS resource, a PUSCH resource, an uplink power control parameter, a PUCCH configuration and/or other information. Accordingly, the (e.g., secondary cell) configuration may comprise information corresponding to the secondary cell. The information may be used by the second wireless node to identify (e.g., locate, recognize, indicate, etc.) the uplink carrier. The information may comprise random access resource information, antenna information, an SRS configuration, a PUSCH configuration, the uplink power control parameter, a CQI, channel information, cell identification information, an uplink frequency, an uplink bandwidth, an uplink public resource, a terminal proprietary resource, a quality indicator configuration, TAG information and/or other information. In some examples, the first wireless node may transmit the (e.g., secondary cell) configuration to the second wireless node.

In some examples, (e.g., the uplink carrier within) the secondary cell and/or (e.g., a second uplink carrier of) a primary cell may be used for data transmission from the second wireless node to the first wireless node. Accordingly, the first wireless node may generate an add instruction corresponding to the secondary cell based upon the service demand of the second wireless node and/or the location of the second wireless node. The add instruction may be configured to instruct the second wireless node to access (e.g., identify, use, communicate via, etc.) (e.g., the uplink carrier of) the secondary cell (e.g., for data transmission).

Alternatively and/or additionally, the secondary cell may not (e.g., and/or may cease to) be used for data transmission. Accordingly, the first wireless node may generate a delete instruction corresponding to the secondary cell based upon the service demand of the second wireless node and/or the location of the second wireless node. The delete instruction may be configured to instruct the second wireless node to release (e.g., information of) the secondary cell (e.g., and/or not use the secondary cell for data transmission). In some examples, the delete instruction may comprise information corresponding to the secondary cell. The information may be used by the second wireless node to identify (e.g., locate, recognize, indicate, etc.) and/or release (e.g., information of) the secondary cell. For example, the delete instruction may comprise the uplink frequency, a cell index associated with the secondary cell and/or other information. In some examples, the delete instruction comprises an RRCConnectionReconfiguration message corresponding to the secondary cell.

In some examples, the secondary cell may comprise a plurality of uplink carriers. The plurality of uplink carriers may comprise the uplink carrier and/or a second uplink carrier. Alternatively and/or additionally, the secondary cell may comprise a downlink carrier. In some examples, the secondary cell may comprise merely a single downlink carrier and/or fewer downlink carriers than uplink carriers. The (e.g., secondary cell) configuration may comprise a radio resource control (RRC) message (e.g., RRCConnectionReconfiguration message). The (e.g., secondary cell) configuration may comprise information corresponding to the uplink carrier and/or the second uplink carrier of the secondary cell. In some examples, the second wireless node may use the information to identify (e.g., locate, recognize, indicate, etc.) the secondary cell. The information may comprise an uplink frequency, an index, an uplink bandwidth, an additional spectrum leakage, uplink carrier resource information and/or other information corresponding to the uplink carrier and/or to the second uplink carrier. The uplink carrier resource information may comprise an uplink carrier priority, a random access channel (RACH) configuration, a physical random access channel (PRACH) configuration, a PUCCH configuration, a PUSCH configuration, an SRS configuration, an upstream loop length configuration, a time alignment (TA) timer configuration, TAG information, a maximum transit power and/or other information. In some examples, the first wireless node may transmit the (e.g., secondary cell) configuration to the second wireless node.

In some examples, the first wireless node may generate an add instruction corresponding to the secondary cell based upon the service demand of the second wireless node and/or the location of the second wireless node. The add instruction may be configured to instruct the second wireless node to access (e.g., identify, use, communicate via, etc.) (e.g., the uplink carrier and/or the second uplink carrier of) the secondary cell (e.g., for data transmission).

Alternatively and/or additionally, the first wireless node may generate a delete instruction corresponding to the secondary cell based upon the service demand of the second wireless node and/or the location of the second wireless node. The delete instruction may be configured to instruct the second wireless node to release (e.g., information of) the secondary cell (e.g., and/or not use the secondary cell for data transmission) (e.g., and/or delete the RRCConnectionReconfiguration message). In some examples, the delete instruction may comprise information corresponding to the secondary cell. The information may be used by the second wireless node to identify (e.g., locate, recognize, indicate, etc.) and/or release (e.g., information of) the uplink carrier. For example, the delete instruction may comprise an uplink frequency index and/or a cell index associated with the secondary cell.

Alternatively and/or additionally, one or more (e.g., some, all, etc.) uplink carriers of the secondary cell may not (e.g., and/or may cease to) be used for data transmission. For example, the uplink carrier (e.g., and/or the second uplink carrier) may not (e.g., and/or may cease to) be used for data transmission. Accordingly, the first wireless node may generate a delete instruction corresponding to the uplink carrier (e.g., and/or the second uplink carrier) based upon the service demand of the second wireless node and/or the location of the second wireless node. The delete instruction may be configured to instruct the second wireless node to release (e.g., information of) the uplink carrier (e.g., and/or the second uplink carrier) (e.g., and/or not use the uplink carrier and/or the second uplink carrier for data transmission) (e.g., and/or delete an RRCConnectionReconfiguration message corresponding to the uplink carrier and/or the second uplink carrier). In some examples, the delete instruction may comprise information corresponding to the uplink carrier (e.g., and/or the second uplink carrier) and/or the secondary cell. The information may be used by the second wireless node to identify (e.g., locate, recognize, indicate, etc.) and/or release (e.g., information of) the uplink carrier (e.g., and/or the second uplink carrier) and/or the secondary cell. For example, the information may comprise an uplink frequency index and/or other information associated with the uplink carrier (e.g., and/or the second uplink carrier). Alternatively and/or additionally, the information may comprise a cell index and/or other information associated with the secondary cell.

In some examples, the configuration corresponding to the uplink carrier may comprise a primary cell configuration corresponding to a primary cell. In some examples, the primary cell may comprise a plurality of uplink carriers. The plurality of uplink carriers may comprise the uplink carrier and a second uplink carrier. Alternatively and/or additionally, the primary cell may comprise a downlink carrier. In some examples, the primary cell may comprise merely a single downlink carrier and/or fewer downlink carriers than uplink carriers. The (e.g., primary cell) configuration may comprise a radio resource control (RRC) message (e.g., RRCConnectionReconfiguration message). The (e.g., primary cell) configuration may comprise information corresponding to the primary cell. The information may be used by the second wireless node to identify (e.g., locate, recognize, indicate, etc.) the plurality of uplink carriers and/or the primary cell. The information may comprise a cell index and/or other information. Alternatively and/or additionally, the information may comprise an uplink frequency, an index, an uplink bandwidth, an additional spectrum leakage, uplink carrier resource information and/or other information corresponding to the uplink carrier and to the second uplink carrier. The uplink carrier resource information may comprise an uplink carrier priority, a random access channel (RACH) configuration, a physical random access channel (PRACH) configuration, a PUCCH configuration, a PUSCH configuration, an SRS configuration, an upstream loop length configuration, a time alignment (TA) timer configuration, TAG information, a maximum transit power and/or other information. In some examples, the first wireless node may transmit the (e.g., primary cell) configuration to the second wireless node.

In some examples, the first wireless node may generate an add instruction corresponding to the primary cell based upon the service demand of the second wireless node and/or the location of the second wireless node. The add instruction may be configured to instruct the second wireless node to access (e.g., identify, use, communicate via, etc.) (e.g., the uplink carrier and/or the second uplink carrier of) the primary cell (e.g., for data transmission).

One or more (e.g., some, all, etc.) uplink carriers of the (e.g., plurality of uplink carriers of the) primary cell may not (e.g., and/or may cease to) be used for data transmission. For example, the uplink carrier (e.g., and/or the second uplink carrier) may not (e.g., and/or may cease to) be used for data transmission. Accordingly, the first wireless node may generate a delete instruction corresponding to the uplink carrier (e.g., and/or the second uplink carrier) based upon the service demand of the second wireless node and/or the location of the second wireless node. The delete instruction may be configured to instruct the second wireless node to release (e.g., information of) the uplink carrier and/or the primary cell (e.g., and/or the second uplink carrier) (e.g., and/or not use the uplink carrier, the primary cell and/or the second uplink carrier for data transmission) (e.g., and/or delete an RRCConnectionReconfiguration message corresponding to the uplink carrier and/or the second uplink carrier). In some examples, the delete instruction may comprise information corresponding to the uplink carrier (e.g., and/or the second uplink carrier) and/or the primary cell. The information may be used by the second wireless node to identify (e.g., locate, recognize, indicate, etc.) and/or release (e.g., information of) the uplink carrier (e.g., and/or the second uplink carrier) and/or the primary cell. For example, the information may comprise an uplink frequency index and/or other information associated with the uplink carrier (e.g., and/or the second uplink carrier). Alternatively and/or additionally, the information may comprise a cell index and/or other information associated with the primary cell.

In some examples, the first wireless node may receive a confirmation message from the second wireless node based upon (e.g., receipt and/or usage of) the configuration.

The uplink carrier of the configuration may not be synchronized with one or more (e.g., other) uplink carriers. Various scenarios wherein the uplink carrier is not synchronized with one or more (e.g., other) uplink carriers are contemplated.

For example, the uplink carrier and/or a (e.g., primary and/or secondary) cell comprising the uplink carrier may not be synchronized with one or more uplink carriers within one or more (e.g., other) (e.g., secondary and/or primary) cells (e.g., different than the cell comprising the uplink carrier). Thus, the uplink carrier (e.g., and/or the cell) may be associated with a TAG that is different from a TAG of the one or more uplink carriers within the one or more (e.g., other) (e.g., secondary and/or primary) cells. Accordingly, the first wireless node may generate a message (e.g., an indication) (e.g., configured, used, etc.) to trigger a random access to the uplink carrier. The message may comprise a frequency, a cell index, a random access (e.g., RACH) resource and/or other information associated with the uplink carrier and/or the (e.g., primary and/or secondary) cell (e.g., used by the second wireless node to identify the uplink carrier). The first wireless node may transmit the message to the second wireless node. The first wireless node may transmit the message to the second wireless node based upon (e.g., concurrently with, following, etc.) a time when the second wireless node accesses (e.g., identifies, uses, communicates via, etc.) the uplink carrier of the (e.g., primary and/or secondary) cell (e.g., for data transmission).

Alternatively and/or additionally, the uplink carrier and/or a (e.g., primary and/or secondary) cell comprising the uplink carrier may not be synchronized with one or more uplink carriers within the (e.g., same) (e.g., primary and/or secondary) cell comprising the uplink carrier (e.g., and/or one or more other cells). Thus, the uplink carrier may be associated with a TAG that is different from a TAG of the one or more uplink carriers within the (e.g., primary and/or secondary) cell. Accordingly, the first wireless node may generate the message (e.g., configured, used, etc.) to trigger a random access to the uplink carrier. The message may comprise a frequency, a cell index, an uplink frequency index, a random access (e.g., RACH) resource and/or other information associated with the uplink carrier and/or the (e.g., primary and/or secondary) cell (e.g., used by the second wireless node to identify the uplink carrier). The first wireless node may transmit the message to the second wireless node. The first wireless node may transmit the message to the second wireless node based upon (e.g., concurrently with, following, etc.) a time when the second wireless node accesses (e.g., identifies, uses, communicates via, etc.) the uplink carrier of the (e.g., primary and/or secondary) cell (e.g., for data transmission).

In some examples, the message may comprise a physical downlink control channel (PDCCH) message. Alternatively and/or additionally, the message may comprise a medium access control (MAC) control element (CE) message. Alternatively and/or additionally, the message may comprise an RRC message (e.g., an RRCConnectionReconfiguration message). In some examples, the first wireless node may receive a confirmation message from the second wireless node based upon the random access to the uplink carrier. In some examples, the first wireless node may monitor the random access to the uplink carrier (e.g., by the second wireless node). The second wireless node may (e.g., attempt to) transmit a random access preamble to the first wireless node using (e.g., and/or via) the uplink carrier. Accordingly, the first wireless node may initiate a deletion process for the uplink carrier responsive to determining that the second wireless node transmitted (e.g., and/or attempted to transmit) the random access preamble to the first wireless node using (e.g., and/or via) the uplink carrier a threshold (e.g., maximum) number of times. For example, the first wireless node may receive an indication (e.g., from the second wireless node and/or a third wireless node) (e.g., via the uplink carrier and/or another uplink carrier) each time the second wireless node transmits and/or attempts to transmit the random access preamble to the first wireless node. In another example, the first wireless node may receive a single indication (e.g., from the second wireless node and/or a third wireless node) (e.g., via the uplink carrier and/or another uplink carrier) that indicates that the second wireless node transmitted and/or attempted to transmit the random access preamble to the first wireless node the threshold number of times. The first wireless node may initiate the deletion process by generating a delete instruction corresponding to the uplink carrier and/or transmitting the delete instruction to the second wireless node.

In some examples, the first wireless node and/or the second wireless node may perform a handover (e.g., handoff), in which the first wireless node and/or the second wireless node switch from using an initial primary cell and/or an initial secondary cell for data transmission to using a primary cell and/or a secondary cell for data transmission (e.g., based upon a service demand of the second wireless node and/or a location of the second wireless node). Accordingly, the first wireless node may generate a configuration comprising a primary cell configuration corresponding to the primary cell and/or a secondary cell configuration corresponding to the secondary cell based upon the handover. In some examples, the primary cell may comprise one or more uplink carriers. Alternatively and/or additionally, the secondary cell may comprise one or more uplink carriers. The configuration may comprise information associated with the one or more uplink carriers of the primary cell, the primary cell, the one or more uplink carriers of the secondary cell and/or the secondary cell. The information may be used by the second wireless node to identify (e.g., locate, recognize, indicate, etc.) the one or more uplink carriers of the primary cell, the primary cell, the one or more uplink carriers of the secondary cell and/or the secondary cell. The information may comprise a cell index, a cell identification, an uplink resource, a random access resource, an SRS configuration, an uplink power control parameter, antenna information, a PUSCH configuration, a CQI configuration, TAG information and/or other information associated with the one or more uplink carriers of the primary cell, the primary cell, the one or more uplink carriers of the secondary cell and/or the secondary cell.

The first wireless node may (e.g., then) generate a message (e.g., an indication) to trigger a random access to an uplink carrier of the primary cell. The message may comprise a frequency, a cell index, an uplink frequency index, a random access (e.g., RACH) resource and/or other information associated with the uplink carrier of the primary cell (e.g., used by the second wireless node to identify the uplink carrier). Then, in order to have the one or more uplink carriers of the primary cell and/or the one or more uplink carriers of the secondary cell synchronized (e.g., with each other), the first wireless node may generate one or more messages (e.g., indications) to trigger one or more random accesses to one or more (e.g., other) uplink carriers comprised within the primary cell and/or the secondary cell.

Figure 1B:
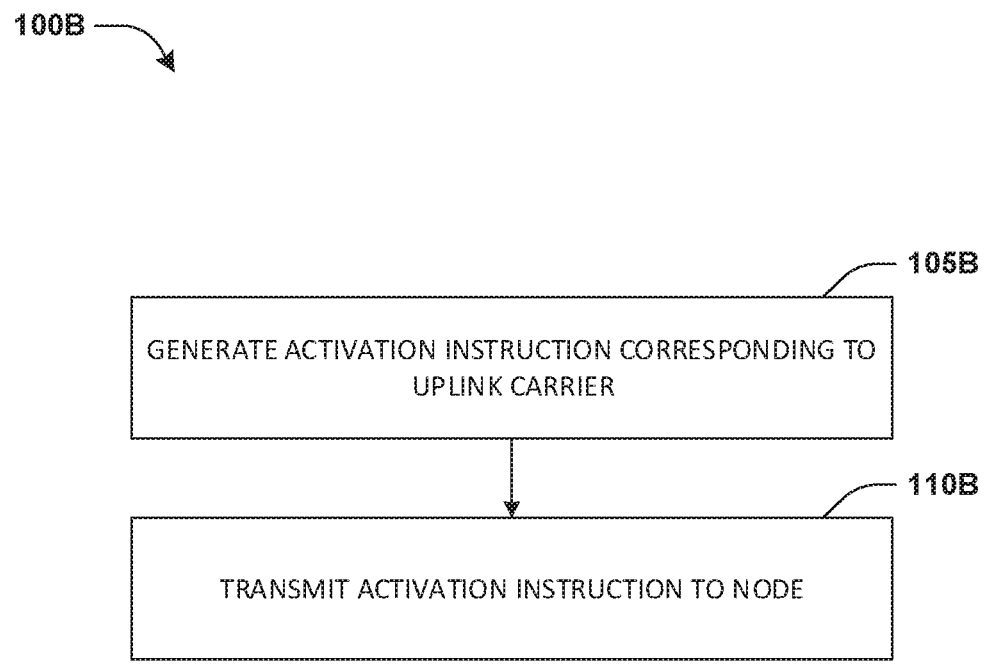
FIG. 1B is a flow chart illustrating an example method for facilitating transmission of an activation instruction.

An example 100B of facilitating transmission of an activation instruction from a first wireless node to a second wireless node is illustrated in FIG. 1B. The first wireless node may be a network and/or BS and the second wireless node may be a UE. The second wireless node may (e.g., be required to) transmit one or more data packets to the first wireless node using an uplink carrier of a (e.g., primary and/or secondary) cell. Accordingly, at 105B, the first wireless node may generate an activation instruction corresponding to the uplink carrier.

The uplink carrier may be used for data transmission based upon a service demand of the second wireless node and/or a location of the second wireless node. Accordingly, the activation instruction may be configured to trigger activation of the uplink carrier. Alternatively and/or additionally, a plurality of uplink carriers (e.g., some, all, etc.) of the (e.g., primary and/or secondary) cell may be used for data transmission based upon the service demand of the second wireless node and/or the location of the second wireless node. Accordingly, the activation instruction may be configured to trigger activation of the plurality of uplink carriers. The activation instruction may comprise a cell index, an uplink frequency index and/or other information associated with the uplink carrier (e.g., and/or the plurality of uplink carriers) and/or the (e.g., primary and/or secondary) cell (e.g., used by the second wireless node to identify and/or activate the uplink carrier). In some examples, the activation instruction comprises a PDCCH message. Alternatively and/or additionally, the activation instruction comprises a MAC CE message. Alternatively and/or additionally, the message comprises an RRC message. In some examples, at 110B, the first wireless node may transmit the activation instruction to the second wireless node.

In some examples, the uplink carrier (e.g., and/or the plurality of uplink carriers) may not be synchronized with one or more (e.g., other) uplink carriers within one or more (e.g., primary and/or secondary) cells. Thus, the uplink carrier (e.g., and/or the plurality of uplink carriers) may be associated with a TAG that is different from a TAG of the one or more (e.g., other) uplink carriers. Accordingly, the first wireless node may (e.g., then) generate a message (e.g., an indication) to trigger a random access to the uplink carrier (e.g., and/or the plurality of uplink carriers). The message may comprise a frequency, a cell index, an uplink frequency index, a random access (e.g., RACH) resource and/or other information associated with the uplink carrier (e.g., and/or the plurality of uplink carriers) (e.g., used by the second wireless node to identify the uplink carrier). The first wireless node may (e.g., then) transmit the message to the second wireless node. The first wireless node may transmit the message to the second wireless node based upon (e.g., concurrently with, following, etc.) a time when the second wireless node activates (e.g., accesses, identifies, uses, communicates via, etc.) the uplink carrier (e.g., and/or the plurality of uplink carriers) (e.g., for data transmission).

Figure 1C:
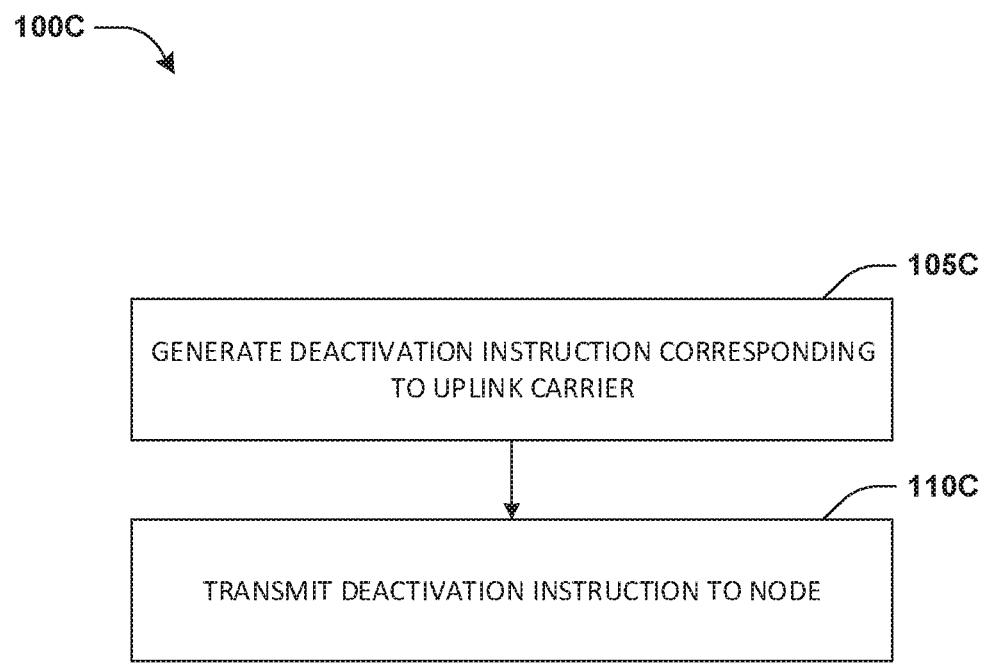
FIG. 1C is a flow chart illustrating an example method for facilitating transmission of a deactivation instruction.

An example 100C of facilitating transmission of a deactivation instruction from a first wireless node to a second wireless node is illustrated in FIG. 1C. The first wireless node may be a network and/or BS and the second wireless node may be a UE. In some examples, at 105C, the first wireless node may generate a deactivation instruction corresponding to an uplink carrier. In some examples, the uplink carrier may be comprised within a (e.g., primary and/or secondary) cell.

The uplink carrier may not (e.g., and/or may cease to) be used for data transmission based upon a service demand of the second wireless node and/or a location of the second wireless node. Accordingly, the deactivation instruction may be configured to trigger deactivation of the uplink carrier. Alternatively and/or additionally, a plurality of uplink carriers (e.g., some, all, etc.) of the (e.g., primary and/or secondary) cell may not (e.g., and/or may cease to) be used for data transmission based upon the service demand of the second wireless node and/or the location of the second wireless node. Accordingly, the deactivation instruction may be configured to trigger deactivation of the plurality of uplink carriers. The deactivation instruction may comprise a cell index, an uplink frequency index and/or other information associated with the uplink carrier (e.g., and/or the plurality of uplink carriers) and/or the (e.g., primary and/or secondary) cell (e.g., used by the second wireless node to identify the uplink carrier). In some examples, the deactivation instruction comprises a PDCCH message. Alternatively and/or additionally, the deactivation instruction comprises a MAC CE message. Alternatively and/or additionally, the message comprises an RRC message. In some examples, at 110C, the first wireless node may transmit the deactivation instruction to the second wireless node.

Figure 1D:
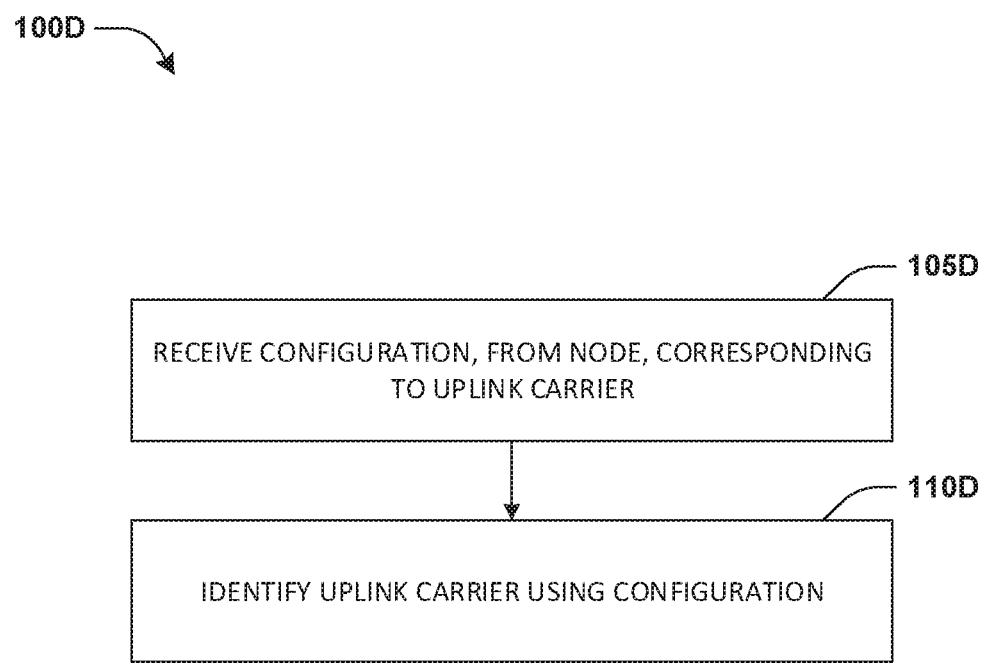
FIG. 1D is a flow chart illustrating an example method for facilitating receipt of a configuration.

An example 100D of facilitating receipt of a configuration from a first wireless node to a second wireless node is illustrated in FIG. 1D. The first wireless node may be a network and/or BS and the second wireless node may be a UE. The second wireless node may (e.g., be required to) transmit one or more data packets to the first wireless node using an uplink carrier. Accordingly, at 105D, the second wireless node may receive a configuration corresponding to the uplink carrier from the first wireless node. In some examples, the configuration corresponding to the uplink carrier may not correspond to (e.g., not include) a downlink carrier.

In some examples, the uplink carrier may be associated with (e.g., comprise) an identification and/or other information. Accordingly, the configuration may comprise information corresponding to the uplink carrier. In some examples, at 110D, the second wireless node may identify (e.g., locate, recognize, indicate, etc.) the uplink carrier using the configuration (e.g., the information corresponding to the uplink carrier).

In some examples, the configuration corresponding to the uplink carrier may comprise a secondary cell configuration corresponding to a secondary cell. The secondary cell may comprise the uplink carrier. In some examples, the secondary cell may not comprise a downlink carrier. The secondary cell may be associated with an identification and/or other information. Accordingly, the (e.g., secondary cell) configuration may comprise information corresponding to the secondary cell. In some examples, the second wireless node may identify (e.g., locate, recognize, indicate, etc.) the uplink carrier using the (e.g., secondary cell) configuration (e.g., the information corresponding to the uplink carrier).

In some examples, the secondary cell may comprise a plurality of uplink carriers. The plurality of uplink carriers may comprise the uplink carrier and/or a second uplink carrier. Alternatively and/or additionally, the secondary cell may comprise a downlink carrier. In some examples, the secondary cell may comprise merely a single downlink carrier and/or fewer downlink carriers than uplink carriers. The (e.g., secondary cell) configuration may comprise information corresponding to the uplink carrier and/or the second uplink carrier of the secondary cell. In some examples, the second wireless node may identify (e.g., locate, recognize, indicate, etc.) the uplink carrier and/or the second uplink carrier using the (e.g., secondary cell) configuration (e.g., the information corresponding to the uplink carrier and/or the second uplink carrier).

In some examples, the configuration corresponding to the uplink carrier may comprise a primary cell configuration corresponding to a primary cell. In some examples, the primary cell may comprise a plurality of uplink carriers. The plurality of uplink carriers may comprise the uplink carrier and/or a second uplink carrier. Alternatively and/or additionally, the primary cell may comprise a downlink carrier. In some examples, the primary cell may comprise merely a single downlink carrier and/or fewer downlink carriers than uplink carriers. The (e.g., primary cell) configuration may comprise information corresponding to the uplink carrier and/or the second uplink carrier of the primary cell. In some examples, the second wireless node may identify (e.g., locate, recognize, indicate, etc.) the uplink carrier and/or the second uplink carrier using the (e.g., primary cell) configuration (e.g., the information corresponding to the uplink carrier and/or the second uplink carrier).

The uplink carrier (e.g., and/or the second uplink carrier) may be used for data transmission based upon a service demand of the second wireless node and/or a location of the second wireless node. Accordingly, the second wireless node may receive an add instruction corresponding to the uplink carrier (e.g., and/or the second uplink carrier) and/or a (e.g., primary and/or secondary) cell comprising the uplink carrier (e.g., and/or the second uplink carrier). The add instruction may be configured to instruct the second wireless node to access (e.g., use, communicate via, etc.) the uplink carrier (e.g., and/or the second uplink carrier) and/or the (e.g., primary and/or secondary) cell (e.g., for data transmission). Accordingly, the second wireless node may access (e.g., identify, use, communicate via, etc.) the uplink carrier (e.g., and/or the second uplink carrier) and/or the (e.g., primary and/or secondary) cell responsive to receiving the add instruction.

The uplink carrier (e.g., and/or the second uplink carrier) may not (e.g., and/or may cease to) be used for data transmission based upon the service demand of the second wireless node and/or the location of the second wireless node. Accordingly, the second wireless node may receive a delete instruction corresponding to the uplink carrier (e.g., and/or the second uplink carrier) and/or the (e.g., primary and/or secondary) cell. The delete instruction may be configured to instruct the second wireless node to release (e.g., information of) the uplink carrier (e.g., and/or the second uplink carrier) and/or the (e.g., primary and/or secondary) cell (e.g., and/or not use the uplink carrier, the cell and/or the second uplink carrier for data transmission). Accordingly, the second wireless node may release (e.g., information of) the uplink carrier (e.g., and/or the second uplink carrier) and/or the (e.g., primary and/or secondary) cell (e.g., and/or not use the uplink carrier, the cell and/or the second uplink carrier for data transmission) responsive to receiving the delete instruction.

In some examples, all (e.g., each, every uplink carrier) of one or more uplink carriers of the primary cell may not (e.g., and/or may cease to) be used for data transmission based upon the service demand of the second wireless node and/or the location of the second wireless node. Accordingly, the second wireless node may receive a delete instruction corresponding to the one or more uplink carriers and/or the primary cell. The second wireless node may (e.g., then) release (e.g., information of) the one or more uplink carriers and/or the primary cell (e.g., and/or not use the uplink carriers and/or the primary cell for data transmission) responsive to receiving the delete instruction. The second wireless node may (e.g., then) enter an idle (e.g., inactive, unused, etc.) state (e.g., and/or may not be used for data transmission).

In some examples, the second wireless node may determine and/or save (e.g., store, retain, etc.) information (e.g., an uplink frequency, an index, an uplink bandwidth, an additional spectrum leakage, uplink carrier resource information, an RACH configuration, a PRACH configuration, a PUCCH configuration, a PUSCH configuration, an SRS configuration, an upstream loop length configuration, a TA timer configuration, TAG information, a maximum transit power and/or other information) corresponding to the uplink carrier (e.g., and/or the second uplink carrier) and/or a (e.g., primary and/or secondary) cell comprising the uplink carrier (e.g., and/or the second uplink carrier) based upon (e.g., and/or responsive to) identifying (e.g., locating, recognizing, indicating, etc.) the uplink carrier (e.g., and/or the second uplink carrier). In some examples, the second wireless node may determine and/or save (e.g., store, retain, etc.) the information based upon (e.g., and/or responsive to) accessing (e.g., using, communicating via, etc.) the uplink carrier.

In some examples, the uplink carrier is comprised within a secondary cell. In some examples, the secondary cell may not comprise a downlink carrier. In some examples, the secondary a cell may comprise merely a single downlink carrier and/or fewer downlink carriers than uplink carriers. Accordingly, one or more (e.g., other) (e.g., primary and/or secondary) cells may perform cross carrier scheduling associated with the secondary cell. In some examples, the first wireless node may indicate (e.g., generate and/or transmit) information (e.g., cell index, frequency point information, etc.) of the uplink carrier (e.g., used by the second wireless node to perform cross carrier scheduling) and/or the secondary cell to the second wireless node. In some examples, the first wireless node may indicate (e.g., generate and/or transmit) the information to the second wireless node responsive to determining that an (e.g., scheduled) uplink resource corresponding to the uplink carrier shall be used (e.g., accessed, identified, used, communicated via, etc.).

In some examples, the second wireless node may generate a confirmation message based upon (e.g., responsive to) identifying (e.g., locating, recognizing, indicating, etc.) the uplink carrier (e.g., and/or the second uplink carrier). Alternatively and/or additionally, the second wireless node may generate the confirmation message based upon (e.g., responsive to) accessing (e.g., using, communicating via, etc.) the uplink carrier (e.g., and/or the second uplink carrier). Alternatively and/or additionally, the second wireless node may generate the confirmation message based upon (e.g., responsive to) releasing (e.g., information of) the uplink carrier (e.g., and/or the second uplink carrier) (e.g., and/or not using the uplink carrier and/or the second uplink carrier for data transmission). Accordingly, the second wireless node may transmit the confirmation message to the first wireless node.

The uplink carrier of the configuration may not be synchronized with one or more (e.g., other) uplink carriers. Various scenarios wherein the uplink carrier is not synchronized with one or more (e.g., other) uplink carriers are contemplated.

For example, the uplink carrier and/or a (e.g., primary and/or secondary) cell comprising the uplink carrier may not be synchronized with one or more uplink carriers within one or more (e.g., other) (e.g., secondary and/or primary) cells (e.g., different than the cell comprising the uplink carrier). Thus, the uplink carrier (e.g., and/or the cell) may be associated with a TAG that is different from a TAG of the one or more uplink carriers within the one or more (e.g., other) (e.g., secondary and/or primary) cells. Accordingly, the second wireless node may receive a message (e.g., an indication) (e.g., configured to trigger a random access to the uplink carrier) from the first wireless node. The message may comprise information (e.g., a frequency, a cell index, a random access resource, an RACH configuration and/or other information) associated with the uplink carrier and/or the (e.g., primary and/or secondary) cell. The second wireless node may initiate the random access to the uplink carrier based upon (e.g., and/or responsive to receiving) the message (e.g., and/or the information).

Alternatively and/or additionally, the uplink carrier and/or a (e.g., primary and/or secondary) cell comprising the uplink carrier may not be synchronized with one or more uplink carriers within the (e.g., same) (e.g., primary and/or secondary) cell comprising the uplink carrier. Thus, the uplink carrier may be associated with a TAG that is different from a TAG of the one or more uplink carriers within the (e.g., primary and/or secondary) cell. Accordingly, the second wireless node may receive a message (e.g., an indication) (e.g., configured to trigger a random access to the uplink carrier) from the first wireless node. The message may comprise information (e.g., a frequency, a cell index, a random access resource, an RACH configuration and/or other information) associated with the uplink carrier and/or the (e.g., primary and/or secondary) cell. The second wireless node may initiate the random access to the uplink carrier based upon (e.g., and/or responsive to receiving) the message (e.g., and/or the information).

In some examples, the message may comprise a PDCCH message. Alternatively and/or additionally, the message may comprise a MAC CE message. Alternatively and/or additionally, the message may comprise an RRC message (e.g., an RRCConnectionReconfiguration message).

In some examples, the second wireless node may (e.g., attempt to) transmit a random access preamble to the first wireless node using (e.g., and/or via) the uplink carrier. For example, the second wireless node may generate and/or transmit an indication to the first wireless node (e.g., and/or a third wireless node) (e.g., via the uplink carrier and/or another uplink carrier) each time the second wireless node transmits and/or attempts to transmit the random access preamble to the first wireless node. In another example, the second wireless node may generate and/or transmit a single indication to the first wireless node (e.g., and/or a third wireless node) (e.g., via the uplink carrier and/or another uplink carrier) that indicates that the second wireless node transmitted and/or attempted to transmit the random access preamble to the first wireless node a threshold (e.g., maximum) number of times. The second wireless node may initiate a deletion process for the uplink carrier and/or release (e.g., information of) the uplink carrier (e.g., and/or not use the uplink carrier for data transmission) responsive to transmitting the random access preamble the threshold number of times. The second wireless node may receive a delete instruction from the first wireless node (e.g., based upon and/or responsive to the first wireless node determining that the second wireless node transmitted the random access preamble to the first wireless node the threshold number of times). The second wireless node may release (e.g., information of) the uplink carrier (e.g., and/or not use the uplink carrier for data transmission) based upon (e.g., and/or responsive to receiving) the delete instruction.

In some examples, the second wireless node may determine and/or save (e.g., store, retain, etc.) information (e.g., a TA value and/or other information) corresponding to the uplink carrier and/or the (e.g., primary and/or secondary) cell (e.g., comprising the uplink carrier) based upon the random access to the uplink carrier. For example, the second wireless node may determine and/or save (e.g., store, retain, etc.) the corresponding to the uplink carrier and/or the (e.g., primary and/or secondary) cell based upon performing and/or completing the random access to the uplink carrier. Alternatively and/or additionally, the second wireless node may determine and/or save (e.g., store, retain, etc.) the information corresponding to the uplink carrier and/or the (e.g., primary and/or secondary) cell based upon (e.g., and/or responsive to receiving) the message (e.g., configured to trigger the random access to the uplink carrier).

In some examples, the second wireless node may generate a confirmation message based upon the random access to the uplink carrier. Alternatively and/or additionally, the second wireless node may generate the confirmation message based upon (e.g., and/or responsive to) completing the random access to the uplink carrier. In another example, the second wireless node may receive an indication from the first wireless node (e.g., and/or a third wireless node) that indicates completion of the random access to the uplink carrier.

Accordingly, the second wireless node may generate the confirmation message based upon (e.g., and/or responsive to receiving) the indication. The second wireless node may transmit the confirmation message to the first wireless node.

In some examples, the first wireless node and/or the second wireless node may perform a handover (e.g., handoff), in which the first wireless node and/or the second wireless node switch from using an initial primary cell and/or an initial secondary cell for data transmission to using a primary cell and/or a secondary cell for data transmission (e.g., based upon a service demand of the second wireless node and/or a location of the second wireless node). In some examples, the second wireless node may receive a configuration based upon the handover (e.g., handoff). In some examples, the configuration may comprise a primary cell configuration corresponding to the primary cell and/or a secondary cell configuration corresponding to the secondary cell. Alternatively and/or additionally, the configuration may comprise a plurality of secondary cell configurations corresponding to a plurality of secondary cells. In some examples, the primary cell may comprise one or more uplink carriers. Alternatively and/or additionally, the secondary cell may comprise one or more uplink carriers.

The configuration may comprise information associated with the one or more uplink carriers of the primary cell, the primary cell, the one or more uplink carriers of the secondary cell and/or the secondary cell. In some examples, the second wireless node may identify (e.g., locate, recognize, indicate, etc.) the one or more uplink carriers of the primary cell and/or the one or more uplink carriers of the secondary cell using the configuration (e.g., the information associated with the one or more uplink carriers of the primary cell, the primary cell, the secondary cell and/or the one or more uplink carriers of the secondary cell).

The one or more uplink carriers of the primary cell and/or the one or more uplink carriers of the secondary cell may be used for data transmission based upon a service demand of the second wireless node and/or a location of the second wireless node. Accordingly, the second wireless node may access (e.g., identify, use, communicate via, etc.) the one or more uplink carriers of the primary cell and/or the one or more uplink carriers of the secondary cell responsive to receiving an add instruction corresponding to the one or more uplink carriers of the primary cell, the primary cell, the secondary cell and/or the one or more uplink carriers of the secondary cell).

The second wireless node may receive a message (e.g., an indication), configured to trigger a random access to an uplink carrier of the primary cell, from the first wireless node. The message may comprise information (e.g., a frequency, a cell index, a random access resource, an RACH configuration and/or other information) associated with the uplink carrier of the primary cell. The second wireless node may initiate the random access to the uplink carrier of the primary cell based upon (e.g., and/or responsive to receiving) the message (e.g., the information). In some examples, the second wireless node may generate a confirmation message based upon the random access to the uplink carrier. Then, in order to have the one or more uplink carriers of the primary cell and/or the one or more uplink carriers of the secondary cell synchronized (e.g., with each other), the second wireless node may receive one or more messages to trigger one or more random accesses to one or more (e.g., other) uplink carriers comprised within the primary cell and/or the secondary cell. The second wireless node may initiate a random access to the one or more (e.g., other) uplink carriers based upon (e.g., and/or responsive to receiving) the message.

Figure 1E:
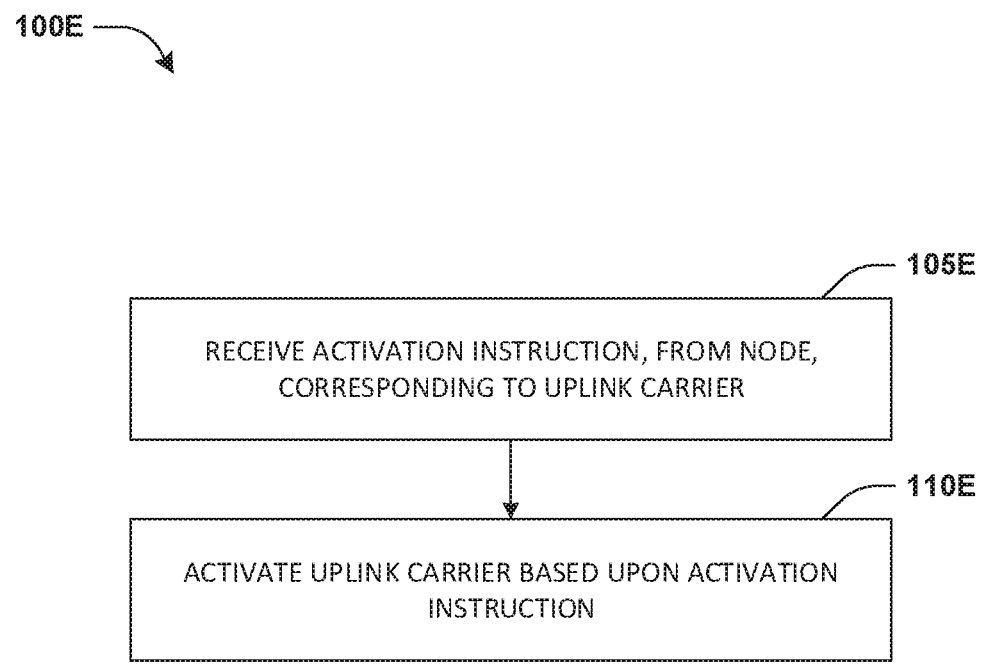
FIG. 1E is a flow chart illustrating an example method for facilitating receipt of an activation instruction.

An example 100E of facilitating receipt of an activation instruction from a first wireless node to a second wireless node is illustrated in FIG. 1E. The first wireless node may be a network and/or BS and the second wireless node may be a UE. The second wireless node may (e.g., be required to) transmit one or more data packets to the first wireless node using an uplink carrier of a (e.g., primary and/or secondary) cell. Accordingly, at 105E, the second wireless node may receive an activation instruction corresponding to the uplink carrier from the first wireless node (e.g., and/or a third wireless node).

The activation instruction may be configured to trigger activation of the uplink carrier. Accordingly, at 110E the second wireless node may activate (e.g., access, identify, use, communicate via, etc.) the uplink carrier based upon (e.g., responsive to receiving) the activation instruction. Alternatively and/or additionally, the activation instruction may be configured to trigger activation of a plurality of uplink carriers (e.g., some, all, etc.) of the (e.g., primary and/or secondary) cell. Accordingly, the second wireless node may activate (e.g., access, identify, use, communicate via, etc.) the uplink carrier (e.g., and/or the plurality of uplink carriers) based upon (e.g., and/or responsive to receiving) the activation instruction.

In some examples, the uplink carrier (e.g., and/or the plurality of uplink carriers) may not be synchronized with one or more other uplink carriers within the (e.g., primary and/or secondary) cell and/or within one or more other (e.g., primary and/or secondary) cells. Thus, the uplink carrier (e.g., and/or the plurality of uplink carriers) may be associated with a TAG that is different from a TAG of the one or more other uplink carriers. Accordingly, the second wireless node may (e.g., then) receive a message (e.g., an indication) to trigger a random access to the uplink carrier (e.g., and/or the plurality of uplink carriers). The message may comprise information (e.g., a frequency, a cell index, a random access resource, an RACH configuration and/or other information) associated with the uplink carrier (e.g., and/or the plurality of uplink carriers). The second wireless node may (e.g., then) initiate the random access to the uplink carrier (e.g., and/or the plurality of uplink carriers) based upon (e.g., and/or responsive to receiving) the message (e.g., the information).

Figure 1F:
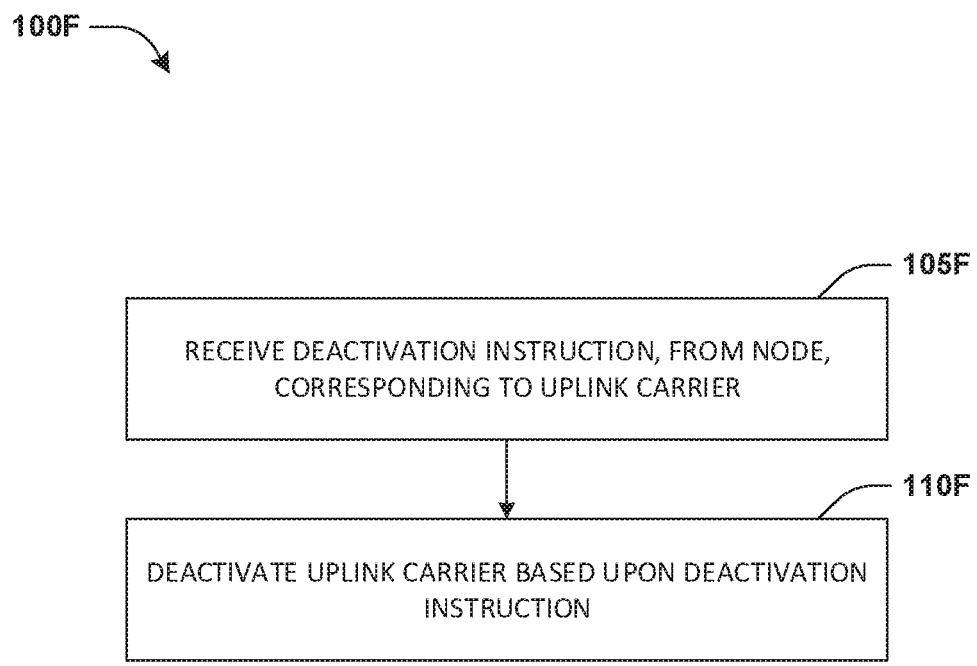
FIG. 1F is a flow chart illustrating an example method for facilitating receipt of a deactivation instruction.

An example 100F of facilitating receipt of a deactivation instruction from a first wireless node to a second wireless node is illustrated in FIG. 1F. The first wireless node may be a network and/or BS and the second wireless node may be a UE. In some examples, at 105F, the second wireless node may receive a deactivation instruction corresponding to an uplink carrier from the first wireless node (e.g., and/or a third wireless node). In some examples, the uplink carrier may be comprised within a (e.g., primary and/or secondary) cell.

The deactivation instruction may be configured to trigger deactivation of the uplink carrier. Accordingly, at 110F, the second wireless node may deactivate (e.g., cease accessing, cease using, cease communicating via, etc.) (e.g., and/or release information of) the uplink carrier based upon (e.g., responsive to receiving) the deactivation instruction. Alternatively and/or additionally, the deactivation instruction may be configured to trigger deactivation of a plurality of uplink carriers (e.g., some, all, etc.) of the (e.g., primary and/or secondary) cell. Accordingly, the second wireless node may deactivate (e.g., cease accessing, cease using, cease communicating via, etc.) (e.g., and/or release information of) the uplink carrier (e.g., and/or the plurality of uplink carriers) based upon (e.g., and/or responsive to receiving) the deactivation instruction.

Figure 2:
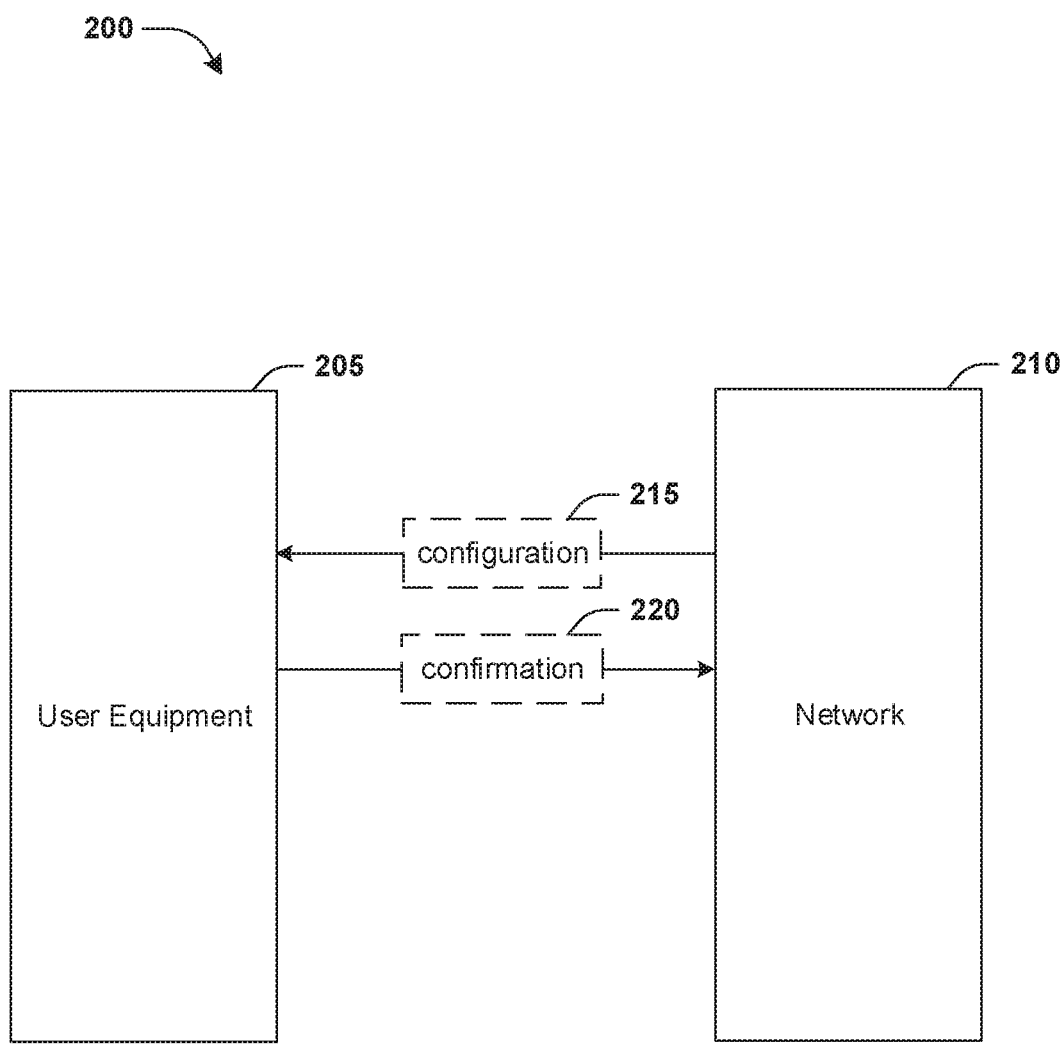
FIG. 2 is a diagram illustrating an example system for facilitating transmission of a configuration.

FIG. 2 illustrates an example of a system 200 for facilitating transmission of a configuration 215 from a first wireless node 210 to a second wireless node 205. The first wireless node 210 may be a network and/or BS and the second wireless node 205 may be a UE. The second wireless node 205 may (e.g., be required to) transmit one or more data packets to the first wireless node 210 using an uplink carrier. Accordingly, the first wireless node 210 may generate a configuration 215 corresponding to the uplink carrier. In some examples, the configuration 215 may correspond to a (e.g., primary and/or secondary) cell. In some examples, the (e.g., primary and/or secondary) cell may not comprise (e.g., not include) a downlink carrier. Alternatively and/or additionally, the (e.g., primary and/or secondary) cell may comprise a downlink carrier. In some examples, the (e.g., primary and/or secondary) cell may comprise merely a single downlink carrier and/or fewer downlink carriers than uplink carriers.

In some examples, the first wireless node 210 may transmit the configuration 215 to the second wireless node 205. The uplink carrier and/or the (e.g., primary and/or secondary) cell may be used for data transmission based upon a service demand of the second wireless node 205 and/or a location of the second wireless node 205. Accordingly, the first wireless node 210 may generate an add instruction corresponding to the uplink carrier and/or to the (e.g., primary and/or secondary) cell. In some examples, the add instruction may be comprised within (e.g., and/or transmitted to the second wireless node 205 within) the configuration 215. The add instruction may be configured to instruct the second wireless node 205 to access (e.g., identify, use, communicate via, etc.) the uplink carrier and/or the (e.g., primary and/or secondary) cell (e.g., for data transmission). Accordingly, the second wireless node 205 may access (e.g., identify, use, communicate via, etc.) the uplink carrier and/or the (e.g., primary and/or secondary) cell responsive to receiving the add instruction and/or the configuration 215.

Alternatively and/or additionally, the uplink carrier and/or the (e.g., primary and/or secondary) cell may not (e.g., and/or may cease to) be used for data transmission based upon the service demand of the second wireless node 205 and/or the location of the second wireless node 205. Accordingly, the first wireless node 210 may generate a delete instruction corresponding to the uplink carrier and/or the (e.g., primary and/or secondary) cell. In some examples, the delete instruction may be comprised within (e.g., and/or transmitted to the second wireless node 205 within) the configuration 215. The delete instruction may be configured to instruct the second wireless node 205 to release (e.g., information of) the uplink carrier and/or the (e.g., primary and/or secondary) cell (e.g., and/or not use the uplink carrier and/or the cell for data transmission). Accordingly, the second wireless node 205 may release (e.g., information of) the uplink carrier and/or the (e.g., primary and/or secondary) cell (e.g., and/or not use the uplink carrier and/or the cell for data transmission) responsive to receiving the delete instruction.

In some examples, the second wireless node 205 may generate a confirmation message 220 based upon (e.g., responsive to) identifying (e.g., locating, recognizing, indicating, etc.) the uplink carrier and/or the (e.g., primary and/or secondary) cell. Alternatively and/or additionally, the second wireless node 205 may generate the confirmation message 220 based upon (e.g., responsive to) accessing (e.g., using, communicating via, etc.) the uplink carrier and/or the (e.g., primary and/or secondary) cell. Alternatively and/or additionally, the second wireless node may generate the confirmation message 220 based upon (e.g., responsive to) releasing (e.g., information of) the uplink carrier and/or the (e.g., primary and/or secondary) cell (e.g., and/or not using the uplink carrier and/or the cell for data transmission). Accordingly, the second wireless node 205 may transmit the confirmation message 220 to the first wireless node 210.

Figure 3:
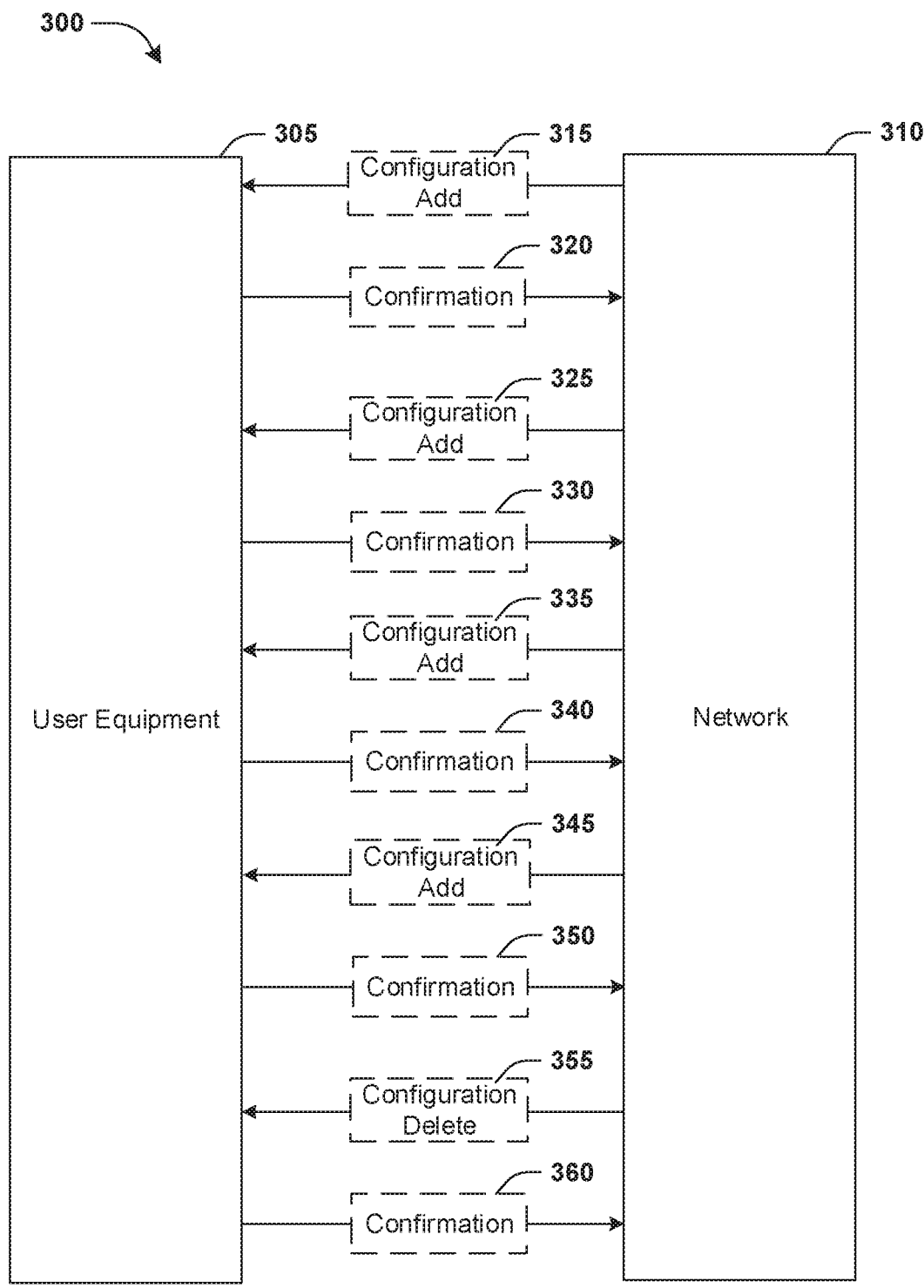
FIG. 3 is a diagram illustrating an example system for facilitating transmission of a plurality of configurations.

FIG. 3 illustrates an example of a system 300 for facilitating transmission of a plurality of configurations from a first wireless node 310 to a second wireless node 305. The first wireless node 310 may be a network and/or BS and the second wireless node 305 may be a UE. The second wireless node 305 may (e.g., be required to) transmit one or more data packets to the first wireless node 310 using one or more uplink carriers and/or one or more (e.g., primary and/or secondary) cells.

Accordingly, the first wireless node 310 may generate a first configuration 315 corresponding to a first (e.g., primary and/or secondary) cell comprising one or more uplink carriers. In some examples, the first (e.g., primary and/or secondary) cell may not comprise (e.g., not include) a downlink carrier. Alternatively and/or additionally, the first (e.g., primary and/or secondary) cell may comprise a downlink carrier. In some examples, the first (e.g., primary and/or secondary) cell may comprise merely a single downlink carrier and/or fewer downlink carriers than uplink carriers. In some examples, the first configuration 315 may comprise an add instruction configured to instruct the second wireless node 305 to access (e.g., identify, use, communicate via, etc.) the first (e.g., primary and/or secondary) cell (e.g., for data transmission). Accordingly, the second wireless node 305 may access (e.g., identify, use, communicate via, etc.) the first (e.g., primary and/or secondary) cell responsive to receiving the first configuration 315. In some examples, the second wireless node 305 may generate a confirmation message 320 based upon (e.g., responsive to) identifying and/or accessing the first (e.g., primary and/or secondary) cell. Accordingly, the second wireless node may transmit the confirmation message 320 to the first wireless node 310.

The first wireless node 310 may generate a second configuration 325 corresponding to a second (e.g., primary and/or secondary) cell comprising one or more uplink carriers. In some examples, the second configuration 325 may comprise an add instruction configured to instruct the second wireless node 305 to access (e.g., identify, use, communicate via, etc.) the second (e.g., primary and/or secondary) cell (e.g., for data transmission). Accordingly, the second wireless node 305 may access (e.g., identify, use, communicate via, etc.) the second (e.g., primary and/or secondary) cell responsive to receiving the second configuration 325. In some examples, the second wireless node 305 may generate a confirmation message 330 based upon (e.g., responsive to) identifying and/or accessing the second (e.g., primary and/or secondary) cell. Accordingly, the second wireless node may transmit the confirmation message 330 to the first wireless node 310.

The first wireless node 310 may generate a third configuration 335 corresponding to a third (e.g., primary and/or secondary) cell comprising one or more uplink carriers. In some examples, the third configuration 335 may comprise an add instruction configured to instruct the second wireless node 305 to access (e.g., identify, use, communicate via, etc.) the third (e.g., primary and/or secondary) cell (e.g., for data transmission). Accordingly, the second wireless node 305 may access (e.g., identify, use, communicate via, etc.) the third (e.g., primary and/or secondary) cell responsive to receiving the third configuration 335. In some examples, the second wireless node 305 may generate a confirmation message 340 based upon (e.g., responsive to) identifying and/or accessing the third (e.g., primary and/or secondary) cell. Accordingly, the second wireless node may transmit the confirmation message 340 to the first wireless node 310.

The first wireless node 310 may generate a fourth configuration 345 corresponding to a fourth (e.g., primary and/or secondary) cell comprising one or more uplink carriers. In some examples, the fourth configuration 345 may comprise an add instruction configured to instruct the second wireless node 305 to access (e.g., identify, use, communicate via, etc.) the fourth (e.g., primary and/or secondary) cell (e.g., for data transmission). Accordingly, the second wireless node 305 may access (e.g., identify, use, communicate via, etc.) the fourth (e.g., primary and/or secondary) cell responsive to receiving the fourth configuration 345. In some examples, the second wireless node 305 may generate a confirmation message 350 based upon (e.g., responsive to) identifying and/or accessing the fourth (e.g., primary and/or secondary) cell. Accordingly, the second wireless node may transmit the confirmation message 350 to the first wireless node 310.

The first wireless node 310 may generate a fifth configuration 355 corresponding to a fifth (e.g., primary and/or secondary) cell comprising one or more uplink carriers. In some examples, the fifth configuration 355 may comprise the first configuration 315, the second configuration 325, the third configuration 335 and/or the fourth configuration 345. Accordingly, the fifth (e.g., primary and/or secondary) cell may comprise the first (e.g., primary and/or secondary) cell, the second (e.g., primary and/or secondary) cell, the third (e.g., primary and/or secondary) cell and/or the fourth (e.g., primary and/or secondary) cell. In some examples, the fifth configuration 355 may comprise a delete instruction configured to instruct the second wireless node 305 to release (e.g., information of) the fifth (e.g., primary and/or secondary) cell (e.g., and/or not use the fifth cell for data transmission). Accordingly, the second wireless node 305 may release (e.g., information of) the fifth (e.g., primary and/or secondary) cell (e.g., and/or not use the fifth cell for data transmission). In some examples, the second wireless node 305 may generate a confirmation message 360 based upon (e.g., responsive to) releasing (e.g., information of) the fifth (e.g., primary and/or secondary) cell (e.g., and/or not using the fifth cell for data transmission). Accordingly, the second wireless node may transmit the confirmation message 360 to the first wireless node 310.

Figure 4A:
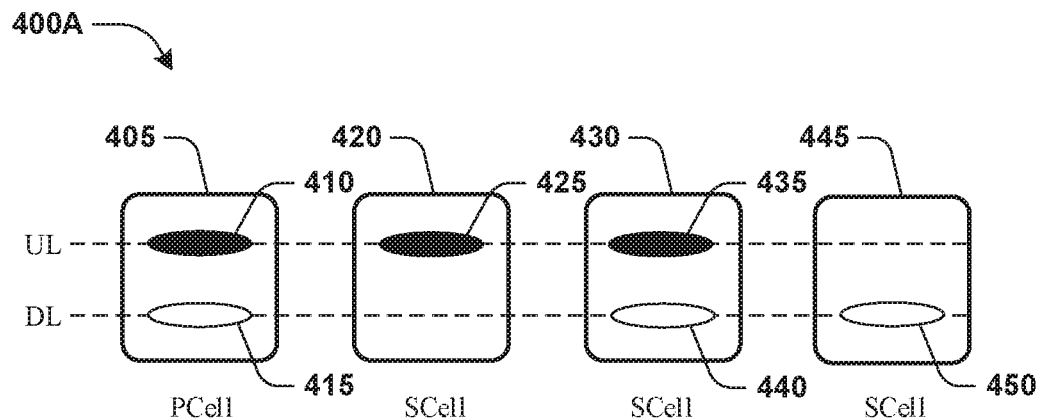
FIG. 4A is a diagram illustrating an example of a plurality of cells.

FIG. 4A illustrates an example of a plurality of cells 400A comprising a primary cell 405, a first secondary cell 420, a second secondary cell 430 and/or a third secondary cell 445. The primary cell 405 may comprise an uplink carrier 410 and/or a downlink carrier 415. The first secondary cell 420 may comprise an uplink carrier 425. The second secondary cell 430 may comprise an uplink carrier 435 and/or a downlink carrier 440. The third secondary cell 445 may comprise a downlink carrier 450.

The system 300 may be applied to at least some of the plurality of cells 400A. For example, the first wireless node 310 may generate the first configuration 315 corresponding to the primary cell 405. In some examples, the add instruction comprised within the first configuration 315 may be configured to instruct the second wireless node 305 to access (e.g., identify, use, communicate via, etc.) the primary cell 405 (e.g., the uplink carrier 410 and/or the downlink carrier 415) (e.g., for data transmission). Accordingly, the second wireless node 305 may access (e.g., identify, use, communicate via, etc.) the primary cell 405 (e.g., the uplink carrier 410 and/or the downlink carrier 415) responsive to receiving the first configuration 315.

Alternatively and/or additionally, the first wireless node 310 may generate the second configuration 325 corresponding to the first secondary cell 420. In some examples, the add instruction comprised within the second configuration 325 may be configured to instruct the second wireless node 305 to access (e.g., identify, use, communicate via, etc.) the first secondary cell 420 (e.g., the uplink carrier 425) (e.g., for data transmission). Accordingly, the second wireless node 305 may access (e.g., identify, use, communicate via, etc.) the first secondary cell 420 (e.g., the uplink carrier 425) responsive to receiving the second configuration 325.

Alternatively and/or additionally, the first wireless node 310 may generate the third configuration 335 corresponding to the second secondary cell 430. In some examples, the add instruction comprised within the third configuration 335 may be configured to instruct the second wireless node 305 to access (e.g., identify, use, communicate via, etc.) the second secondary cell 430 (e.g., the uplink carrier 435 and/or the downlink carrier 440) (e.g., for data transmission). Accordingly, the second wireless node 305 may access (e.g., identify, use, communicate via, etc.) the second secondary cell 430 (e.g., the uplink carrier 435 and/or the downlink carrier 440) responsive to receiving the third configuration 335.

Alternatively and/or additionally, the first wireless node 310 may generate the fourth configuration 345 corresponding to the third secondary cell 445. In some examples, the add instruction comprised within the fourth configuration 345 may be configured to instruct the second wireless node 305 to access (e.g., identify, use, communicate via, etc.) the third secondary cell 445 (e.g., the downlink carrier 450) (e.g., for data transmission). Accordingly, the second wireless node 305 may access (e.g., identify, use, communicate via, etc.) the third secondary cell 445 (e.g., the downlink carrier 450) responsive to receiving the fourth configuration 345.

Figure 4B:
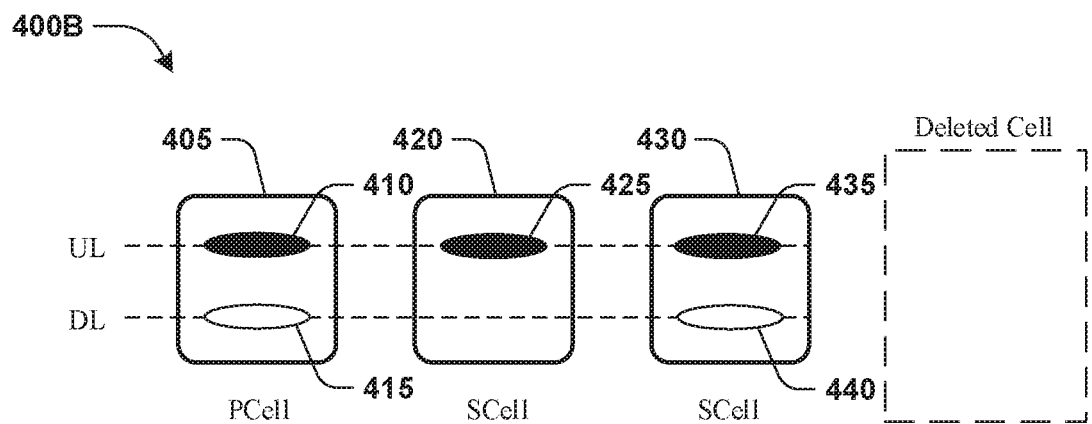
FIG. 4B is a diagram illustrating an example of a plurality of cells.

Alternatively and/or additionally, the first wireless node 310 may generate the fifth configuration 355 corresponding to the third secondary cell 445. In some examples, the delete instruction comprised within the fifth configuration 355 may be configured to instruct the second wireless node 305 to release (e.g., information of) the third secondary cell 445 (e.g., the downlink carrier 450) (e.g., and/or not use the third secondary cell 445 for data transmission). Accordingly, the second wireless node 305 may release (e.g., information of) the third secondary cell 445 (e.g., the downlink carrier 450) (e.g., and/or not use the third secondary cell 445 for data transmission) responsive to receiving the fifth configuration 355. In some examples, the releasing (e.g., information of) the third secondary cell 445 may result in a plurality of cells 400B illustrated in FIG. 4B. The plurality of cells 400B may not comprise the third secondary cell 445.

Figure 5:
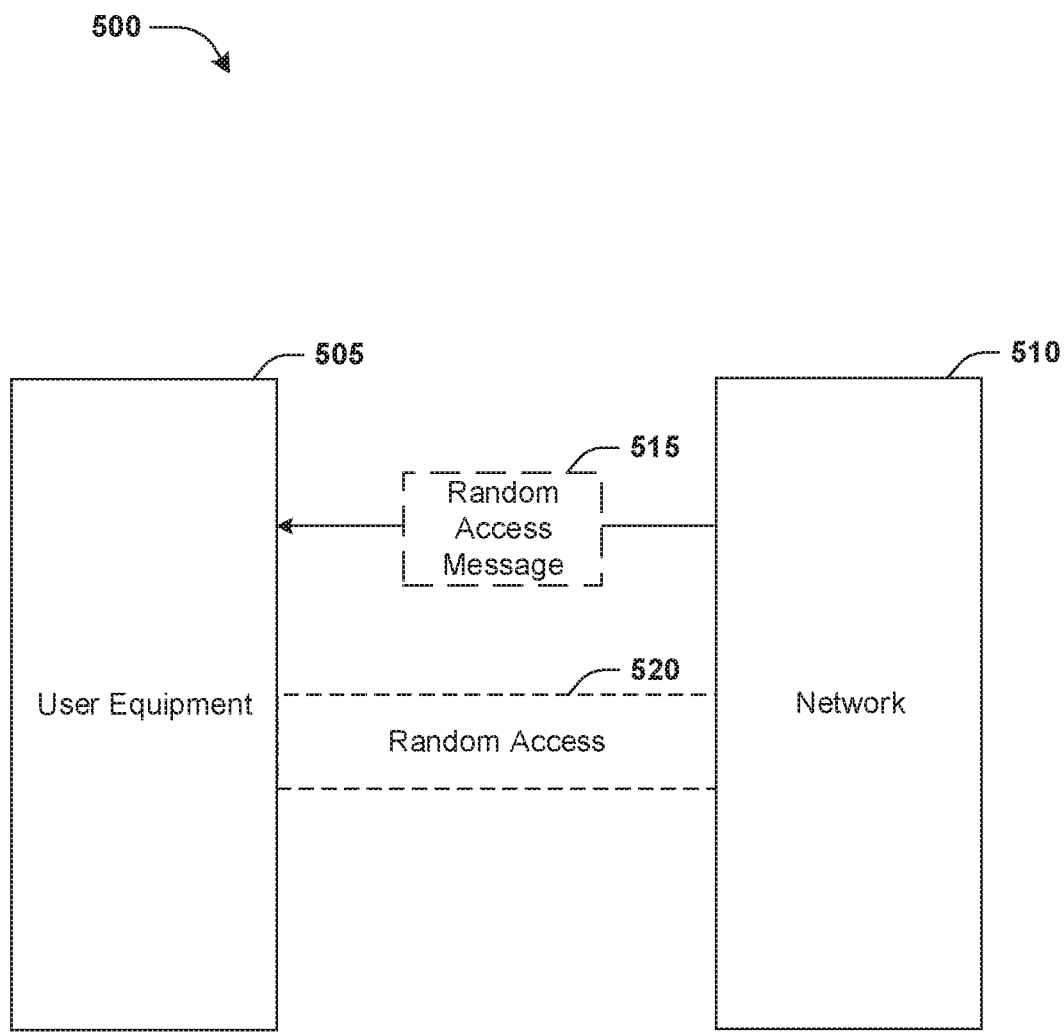
FIG. 5 is a diagram illustrating an example system for facilitating a random access to an uplink carrier.

FIG. 5 illustrates an example of a system 500 for facilitating a random access to an uplink carrier. The uplink carrier may not be synchronized with one or more uplink carriers within one or more (e.g., secondary and/or primary) cells. Thus, the uplink carrier may be associated with a TAG that is different from a TAG of the one or more uplink carriers. Accordingly, a first wireless node 510 may generate a message 515 (e.g., an indication) to trigger a random access 520 to the uplink carrier. The first wireless node 510 may transmit the message 515 to a second wireless node 505. The second wireless node 505 may initiate the random access 520 to the uplink carrier based upon (e.g., and/or responsive to receiving) the message 515. In some examples, the message 515 may comprise a PDCCH message. Alternatively and/or additionally, the message 515 may comprise a MAC CE message. Alternatively and/or additionally, the message 515 may comprise an RRC message (e.g., an RRCConnectionReconfiguration message).

The system 500 may be applied to at least some of the plurality of cells 400A. For example, the uplink carrier 435 of the second secondary cell 430 may not be synchronized with the uplink carrier 410 of the primary cell 405 and/or the uplink carrier 425 of the first secondary cell 420. Thus, the uplink carrier 435 may be associated with a TAG that is different from a TAG of the uplink carrier 410 and/or the uplink carrier 425. Accordingly, the first wireless node 510 may generate the message 515 to trigger the random access 520 to the uplink carrier 435 and/or to synchronize the uplink carrier 435 with one or more other uplink carriers. The first wireless node 510 may transmit the message 515 to the second wireless node 505 based upon (e.g., concurrently with, following, etc.) a time when the second wireless node 505 accesses (e.g., identifies, uses, communicates via, etc.) the uplink carrier 435. The second wireless node 505 may initiate the random access 520 to the uplink carrier 435 based upon (e.g., and/or responsive to receiving) the message 515.

Figure 6:
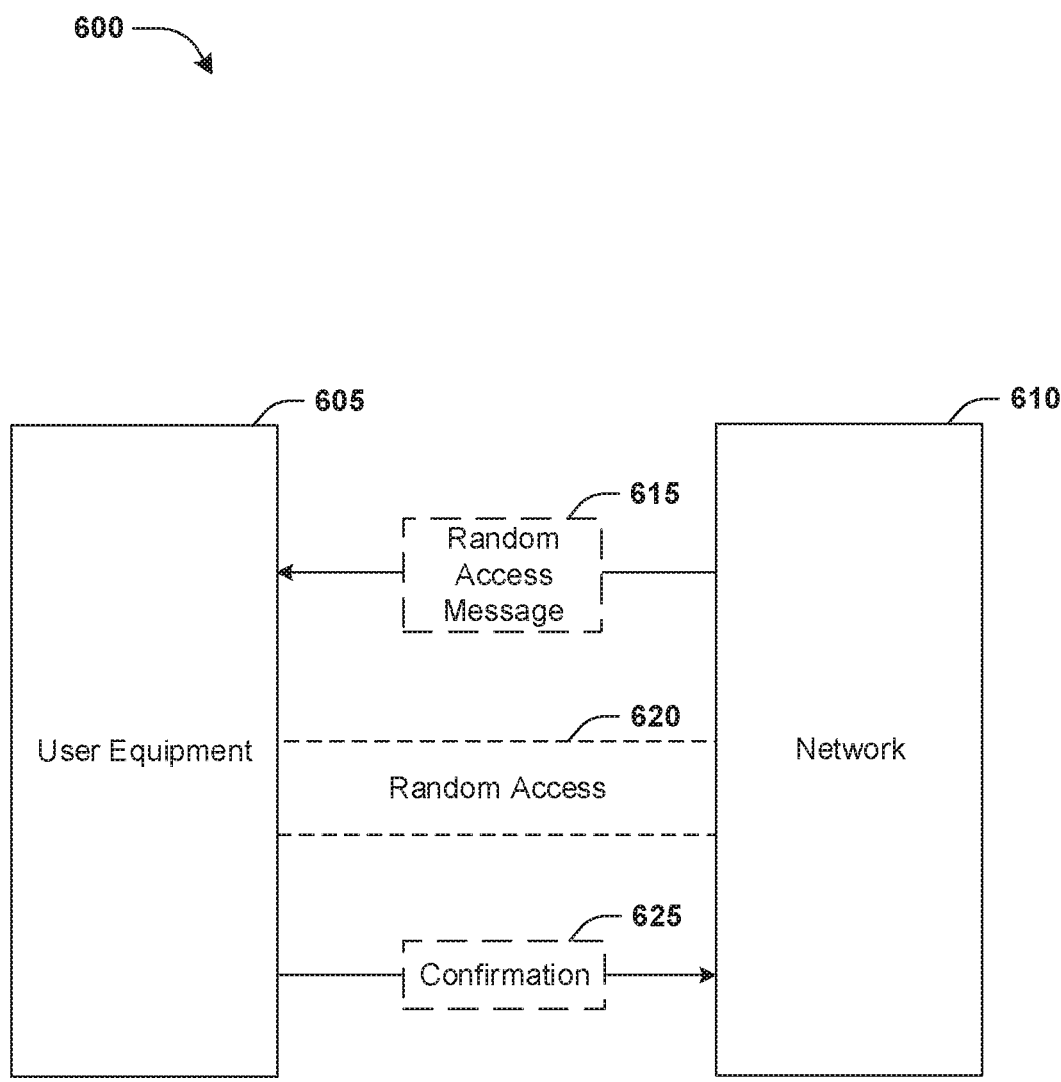
FIG. 6 is a diagram illustrating an example system for facilitating a random access to an uplink carrier.

FIG. 6 illustrates an example of a system 600 for facilitating a random access to an uplink carrier. The uplink carrier may not be synchronized with one or more uplink carriers within one or more (e.g., secondary and/or primary) cells. Thus, the uplink carrier may be associated with a TAG that is different from a TAG of the one or more uplink carriers. Accordingly, a first wireless node 610 may generate a message 615 (e.g., an indication) to trigger a random access 620 to the uplink carrier. In some examples, the message 615 may comprise an RRC message (e.g., an RRCConnectionReconfiguration message). Alternatively and/or additionally, the message 615 may comprise a MAC CE message. Alternatively and/or additionally, the message 615 may comprise a PDCCH message.

The first wireless node 610 may transmit the message 615 to a second wireless node 605. The second wireless node 605 may initiate the random access 620 to the uplink carrier based upon (e.g., and/or responsive to receiving) the message 615. In some examples, the second wireless node 605 may generate a confirmation message 625 based upon the random access 620 to the uplink carrier. Alternatively and/or additionally, the second wireless node 605 may generate the confirmation message 625 based upon (e.g., and/or responsive to) completing the random access 620 to the uplink carrier. The second wireless node 605 may transmit the confirmation message 625 to the first wireless node 610.

The system 600 may be applied to at least some of the plurality of cells 400A. For example, the uplink carrier 435 of the second secondary cell 430 may not be synchronized with the uplink carrier 410 of the primary cell 405 and/or the uplink carrier 425 of the first secondary cell 420. Thus, the uplink carrier 435 may be associated with a TAG that is different from a TAG of the uplink carrier 410 and/or the uplink carrier 425. Accordingly, the first wireless node 610 may generate the message 615 to trigger the random access 620 to the uplink carrier 435 and/or to synchronize the uplink carrier 435 with one or more other uplink carriers. The first wireless node 610 may transmit the message 615 to the second wireless node 605 based upon (e.g., concurrently with, following, etc.) a time when the second wireless node 605 accesses (e.g., identifies, uses, communicates via, etc.) the uplink carrier 435. The second wireless node 605 may initiate the random access 620 to the uplink carrier 435 based upon (e.g., and/or responsive to receiving) the message 615. In some examples, the second wireless node 605 may generate a confirmation message 625 based upon the random access 620 to the uplink carrier 435. Alternatively and/or additionally, the second wireless node 605 may generate the confirmation message 625 based upon (e.g., and/or responsive to) completing the random access 620 to the uplink carrier 435. The second wireless node 605 may transmit the confirmation message 625 to the first wireless node 610.

Figure 7A:
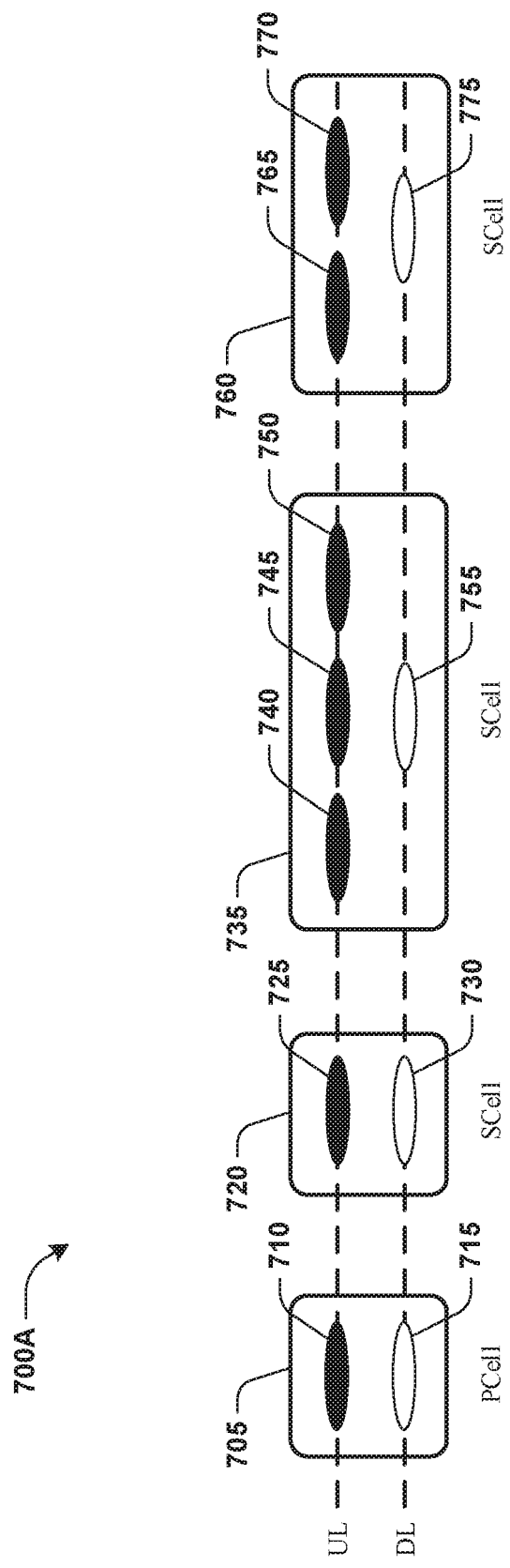
FIG. 7A is a diagram illustrating an example of a plurality of cells.

FIG. 7A illustrates an example of a plurality of cells 700A comprising a primary cell 705, a first secondary cell 720, a second secondary cell 735 and/or a third secondary cell 760. The primary cell 705 may comprise an uplink carrier 710 and/or a downlink carrier 715. The first secondary cell 720 may comprise an uplink carrier 725 and/or a downlink carrier 730. The second secondary cell 735 may comprise an uplink carrier 740, an uplink carrier 745, an uplink carrier 750 and/or a downlink carrier 755. The third secondary cell 760 may comprise an uplink carrier 765, an uplink carrier 770 and/or a downlink carrier 775.

The system 300 may be applied to at least some of the plurality of cells 700A. For example, the first wireless node 310 may generate the first configuration 315 corresponding to the primary cell 705. In some examples, the add instruction comprised within the first configuration 315 may be configured to instruct the second wireless node 305 to access (e.g., identify, use, communicate via, etc.) the primary cell 705 (e.g., the uplink carrier 710 and/or the downlink carrier 715) (e.g., for data transmission). Accordingly, the second wireless node 305 may access (e.g., identify, use, communicate via, etc.) the primary cell 705 (e.g., the uplink carrier 710 and/or the downlink carrier 715) responsive to receiving the first configuration 315.

Alternatively and/or additionally, the first wireless node 310 may generate the second configuration 325 corresponding to the first secondary cell 720. In some examples, the add instruction comprised within the second configuration 325 may be configured to instruct the second wireless node 305 to access (e.g., identify, use, communicate via, etc.) the first secondary cell 720 (e.g., the uplink carrier 725 and/or the downlink carrier 730) (e.g., for data transmission). Accordingly, the second wireless node 305 may access (e.g., identify, use, communicate via, etc.) the first secondary cell 720 (e.g., the uplink carrier 725 and/or the downlink carrier 730) responsive to receiving the second configuration 325.

Alternatively and/or additionally, the first wireless node 310 may generate the third configuration 335 corresponding to the second secondary cell 735. In some examples, the add instruction comprised within the third configuration 335 may be configured to instruct the second wireless node 305 to access (e.g., identify, use, communicate via, etc.) the second secondary cell 735 (e.g., the uplink carrier 740, the uplink carrier 745, the uplink carrier 750 and/or the downlink carrier 755) (e.g., for data transmission). Accordingly, the second wireless node 305 may access (e.g., identify, use, communicate via, etc.) the second secondary cell 735 (e.g., the uplink carrier 740, the uplink carrier 745, the uplink carrier 750 and/or the downlink carrier 755) responsive to receiving the third configuration 335.

Alternatively and/or additionally, the first wireless node 310 may generate the fourth configuration 345 corresponding to the third secondary cell 760. In some examples, the add instruction comprised within the fourth configuration 345 may be configured to instruct the second wireless node 305 to access (e.g., identify, use, communicate via, etc.) the third secondary cell 760 (e.g., the uplink carrier 765, the uplink carrier 770 and/or the downlink carrier 775) (e.g., for data transmission). Accordingly, the second wireless node 305 may access (e.g., identify, use, communicate via, etc.) the third secondary cell 760 (e.g., the uplink carrier 765, the uplink carrier 770 and/or the downlink carrier 775) responsive to receiving the third configuration 335.

Figure 7B:
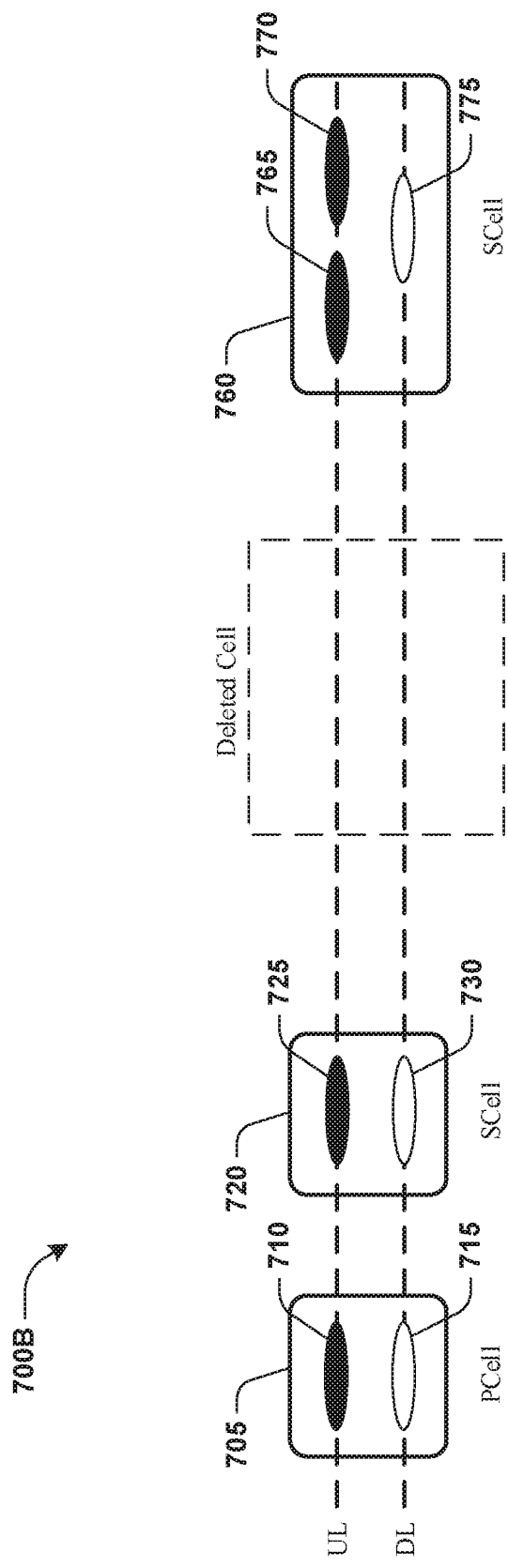
FIG. 7B is a diagram illustrating an example of a plurality of cells.

Alternatively and/or additionally, the first wireless node 310 may generate the fifth configuration 355 corresponding to the second secondary cell 735. In some examples, the delete instruction comprised within the fifth configuration 355 may be configured to instruct the second wireless node 305 to release (e.g., information of) the second secondary cell 735 (e.g., the uplink carrier 740, the uplink carrier 745, the uplink carrier 750 and/or the downlink carrier 755) (e.g., and/or not use the second secondary cell 735 for data transmission). Accordingly, the second wireless node 305 may release (e.g., information of) the second secondary cell 735 (e.g., the uplink carrier 740, the uplink carrier 745, the uplink carrier 750 and/or the downlink carrier 755) (e.g., and/or not use the second secondary cell 735 for data transmission). In some examples, the releasing (e.g., information of) the second secondary cell 735 may result in a plurality of cells 700B illustrated in FIG. 7B. The plurality of cells 700B may not comprise the second secondary cell 735.

An uplink carrier (e.g., and/or a second uplink carrier) comprised within a (e.g., primary and/or secondary) cell (e.g., the primary cell 705, the first secondary cell 720, the second secondary cell 735 and/or the third secondary cell 760) may not be synchronized with one or more uplink carriers within the (e.g., same) (e.g., primary and/or secondary) cell. Thus, the uplink carrier may be associated with a TAG that is different from a TAG of the one or more uplink carriers within the (e.g., primary and/or secondary) cell.

The system 500 may be applied to at least some of the plurality of cells 700A. For example, the uplink carrier 765 of the third secondary cell 760 may not be synchronized with the uplink carrier 770 and/or one or more other uplink carriers (e.g., within the primary cell 705, the first secondary cell 720 and/or the second secondary cell 735). Thus, the uplink carrier 765 may be associated with a TAG that is different from a TAG of the uplink carrier 770 and/or the one or more other uplink carriers. Accordingly, the first wireless node 510 may generate the message 515 to trigger the random access 520 to the uplink carrier 765 and/or to synchronize the uplink carrier 765 with one or more other uplink carriers. The first wireless node 510 may transmit the message 515 to the second wireless node 505 based upon (e.g., concurrently with, following, etc.) a time when the second wireless node 505 accesses (e.g., identifies, uses, communicates via, etc.) the uplink carrier 765. The second wireless node 505 may initiate the random access 520 to the uplink carrier 765 based upon (e.g., and/or responsive to receiving) the message 515.

The system 600 may be applied to at least some of the plurality of cells 700A. For example, the uplink carrier 765 of the third secondary cell 760 may not be synchronized with the uplink carrier 770 and/or one or more other uplink carriers (e.g., within the primary cell 705, the first secondary cell 720 and/or the second secondary cell 735). Thus, the uplink carrier 765 may be associated with a TAG that is different from a TAG of the uplink carrier 770 and/or the one or more other uplink carriers. Accordingly, the first wireless node 610 may generate the message 615 to trigger the random access 620 to the uplink carrier 765 and/or to synchronize the uplink carrier 765 with one or more other uplink carriers. The first wireless node 610 may transmit the message 615 to the second wireless node 605 based upon (e.g., concurrently with, following, etc.) a time when the second wireless node 605 accesses (e.g., identifies, uses, communicates via, etc.) the uplink carrier 765. The second wireless node 605 may initiate the random access 620 to the uplink carrier 765 based upon (e.g., and/or responsive to receiving) the message 615. In some examples, the second wireless node 605 may generate the confirmation message 625 based upon the random access 620 to the uplink carrier 765. Alternatively and/or additionally, the second wireless node 605 may generate the confirmation message 625 based upon (e.g., and/or responsive to) completing the random access 620 to the uplink carrier 765. The second wireless node 605 may transmit the confirmation message 625 to the first wireless node 610.

Figure 8A:
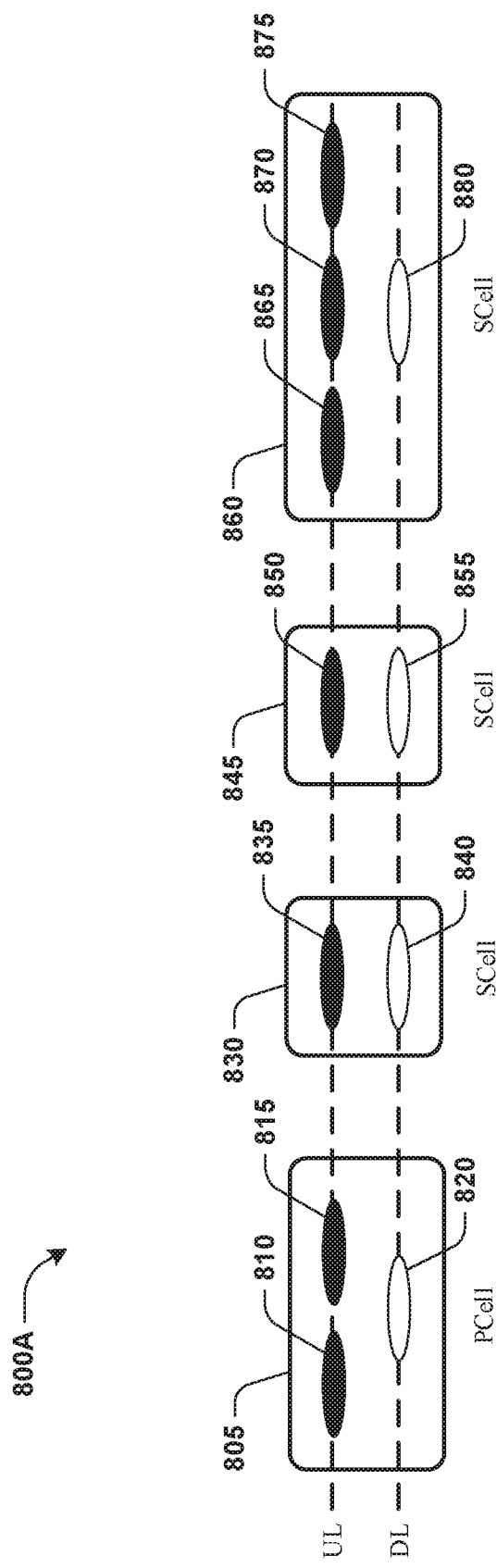
FIG. 8A is a diagram illustrating an example of a plurality of cells.

FIG. 8A illustrates an example of a plurality of cells 800A comprising a primary cell 805, a first secondary cell 830, a second secondary cell 845 and/or a third secondary cell 860. The primary cell 805 may comprise an uplink carrier 810, an uplink carrier 815 and/or a downlink carrier 820. The first secondary cell 830 may comprise an uplink carrier 835 and/or a downlink carrier 840. The second secondary cell 845 may comprise an uplink carrier 850 and/or a downlink carrier 855. The third secondary cell 860 may comprise an uplink carrier 865, an uplink carrier 870, an uplink carrier 875 and/or a downlink carrier 880.

The system 300 may be applied to at least some of the plurality of cells 800A. For example, the first wireless node 310 may generate the first configuration 315 corresponding to the primary cell 805. In some examples, the add instruction comprised within the first configuration 315 may be configured to instruct the second wireless node 305 to access (e.g., identify, use, communicate via, etc.) the primary cell 805 (e.g., the uplink carrier 810, the uplink carrier 815 and/or the downlink carrier 820) (e.g., for data transmission). Accordingly, the second wireless node 305 may access (e.g., identify, use, communicate via, etc.) the primary cell 805 (e.g., the uplink carrier 810, the uplink carrier 815 and/or the downlink carrier 820) responsive to receiving the first configuration 315.

Alternatively and/or additionally, the first wireless node 310 may generate the second configuration 325 corresponding to the first secondary cell 830. In some examples, the add instruction comprised within the second configuration 325 may be configured to instruct the second wireless node 305 to access (e.g., identify, use, communicate via, etc.) the first secondary cell 830 (e.g., the uplink carrier 835 and/or the downlink carrier 840) (e.g., for data transmission). Accordingly, the second wireless node 305 may access (e.g., identify, use, communicate via, etc.) the first secondary cell 830 (e.g., the uplink carrier 835 and/or the downlink carrier 840) responsive to receiving the second configuration 325.

Alternatively and/or additionally, the first wireless node 310 may generate the third configuration 335 corresponding to the second secondary cell 845. In some examples, the add instruction comprised within the third configuration 335 may be configured to instruct the second wireless node 305 to access (e.g., identify, use, communicate via, etc.) the second secondary cell 845 (e.g., the uplink carrier 850 and/or the downlink carrier 855) (e.g., for data transmission). Accordingly, the second wireless node 305 may access (e.g., identify, use, communicate via, etc.) the second secondary cell 845 (e.g., the uplink carrier 850 and/or the downlink carrier 855) responsive to receiving the third configuration 335.

Alternatively and/or additionally, the first wireless node 310 may generate the fourth configuration 345 corresponding to the third secondary cell 860. In some examples, the add instruction comprised within the fourth configuration 345 may be configured to instruct the second wireless node 305 to access (e.g., identify, use, communicate via, etc.) the third secondary cell 860 (e.g., the uplink carrier 865, the uplink carrier 870, the uplink carrier 875 and/or the downlink carrier 880) (e.g., for data transmission). Accordingly, the second wireless node 305 may access (e.g., identify, use, communicate via, etc.) the third secondary cell 860 (e.g., the uplink carrier 865, the uplink carrier 870, the uplink carrier 875 and/or the downlink carrier 880) responsive to receiving the third configuration 335.

Figure 8B:
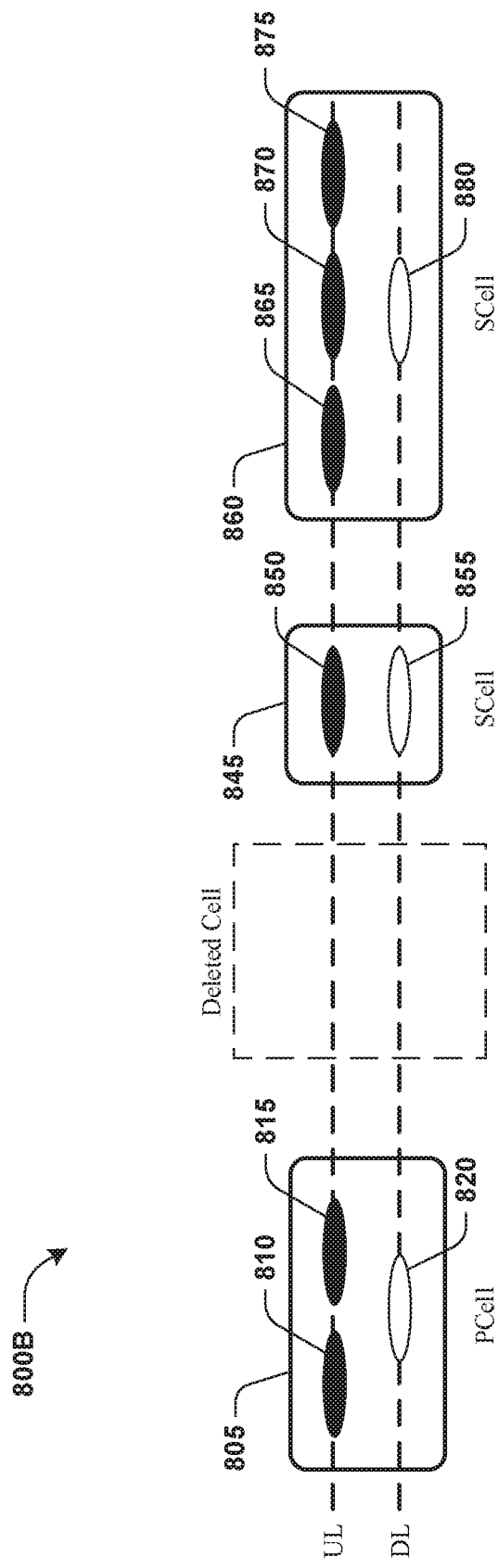
FIG. 8B is a diagram illustrating an example of a plurality of cells.

Alternatively and/or additionally, the first wireless node 310 may generate the fifth configuration 355 corresponding to the first secondary cell 830. In some examples, the delete instruction comprised within the fifth configuration 355 may be configured to instruct the second wireless node 305 to release (e.g., information of) the first secondary cell 830 (e.g., the uplink carrier 835 and/or the downlink carrier 840) (e.g., and/or not use the first secondary cell 830 for data transmission). Accordingly, the second wireless node 305 may release (e.g., information of) the first secondary cell 830 (e.g., the uplink carrier 835 and/or the downlink carrier 840) (e.g., and/or not use the first secondary cell 830 for data transmission). In some examples, the releasing (e.g., information of) the first secondary cell 830 may result in a plurality of cells 800B illustrated in FIG. 8B. The plurality of cells 800B may not comprise the first secondary cell 830.

An uplink carrier (e.g., and/or a second uplink carrier) comprised within a (e.g., primary and/or secondary) cell (e.g., the primary cell 805, the first secondary cell 830, the second secondary cell 845 and/or the third secondary cell 860) may not be synchronized with one or more uplink carriers within the (e.g., same) (e.g., primary and/or secondary) cell and/or within one or more (e.g., other) (e.g., primary and/or secondary) cells. Thus, the uplink carrier may be associated with a TAG that is different from a TAG of the one or more uplink carriers within the (e.g., primary and/or secondary) cell and/or within the one or more (e.g., primary and/or secondary) cells. For example, the uplink carrier 865 of the third secondary cell 860 may not be synchronized with the uplink carrier 870 and/or one or more other uplink carriers (e.g., within the primary cell 805, the first secondary cell 830, the second secondary cell 845 and/or the third secondary cell 860). Thus, the uplink carrier 865 may be associated with a TAG that is different from a TAG of the uplink carrier 870 and/or the one or more other uplink carriers. Accordingly, the system 500 may be applied to at least some of the plurality of cells 800A to perform a random access to the uplink carrier 865 and/or to synchronize the uplink carrier 865 with one or more other uplink carriers. Alternatively and/or additionally, the system 600 may be applied to at least some of the plurality of cells 800A to perform a random access to the uplink carrier 865 and/or to synchronize the uplink carrier 865 with one or more other uplink carriers.

Figure 9:
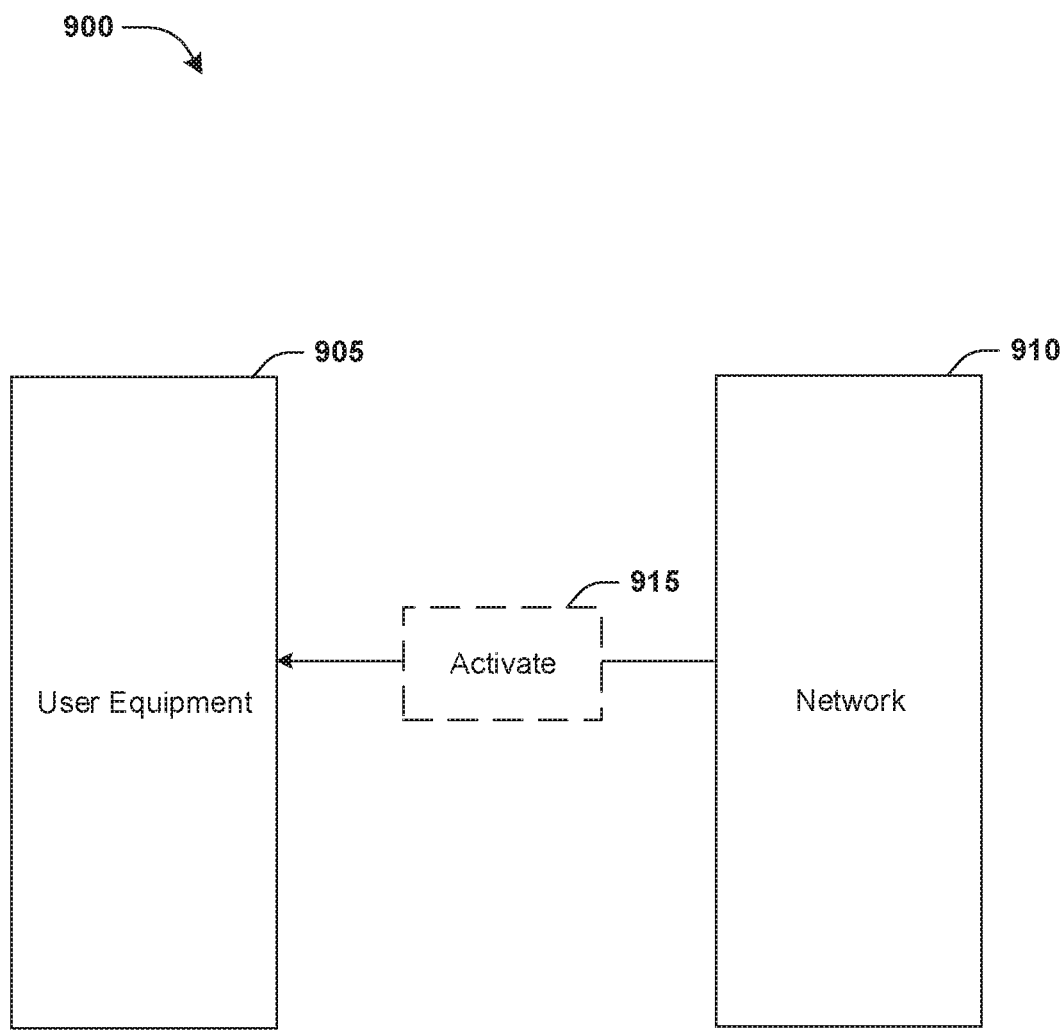
FIG. 9 is a diagram illustrating an example system for facilitating transmission of an activation instruction.

FIG. 9 illustrates an example of a system 900 for facilitating transmission of an activation instruction from a first wireless node 910 to a second wireless node 905. The first wireless node 910 may be a network and/or BS and the second wireless node 905 may be a UE. The second wireless node 905 may (e.g., be required to) transmit one or more data packets to the first wireless node 910 using an uplink carrier of a (e.g., primary and/or secondary) cell. Accordingly, the first wireless node 910 may generate an activation instruction 915 corresponding to the uplink carrier.

The uplink carrier may be used for data transmission based upon a service demand of the second wireless node 905 and/or a location of the second wireless node 905. Accordingly, the activation instruction 915 may be configured to trigger activation of the uplink carrier. Alternatively and/or additionally, a plurality of uplink carriers (e.g., some, all, etc.) of the (e.g., primary and/or secondary) cell may be used for data transmission based upon the service demand of the second wireless node 905 and/or the location of the second wireless node 905. Accordingly, the activation instruction 915 may be configured to trigger activation of the plurality of uplink carriers. In some examples, the activation instruction 915 comprises a PDCCH message. Alternatively and/or additionally, the activation instruction 915 comprises a MAC CE message. Alternatively and/or additionally, the activation instruction 915 comprises an RRC message.

In some examples, the first wireless node 910 may transmit the activation instruction 915 to the second wireless node 905. Accordingly, the second wireless node 905 may receive the activation instruction 915. The second wireless node 905 may activate (e.g., access, identify, use, communicate via, etc.) the uplink carrier (e.g., and/or the plurality of uplink carriers) based upon (e.g., and/or responsive to receiving) the activation instruction 915.

Figure 10:
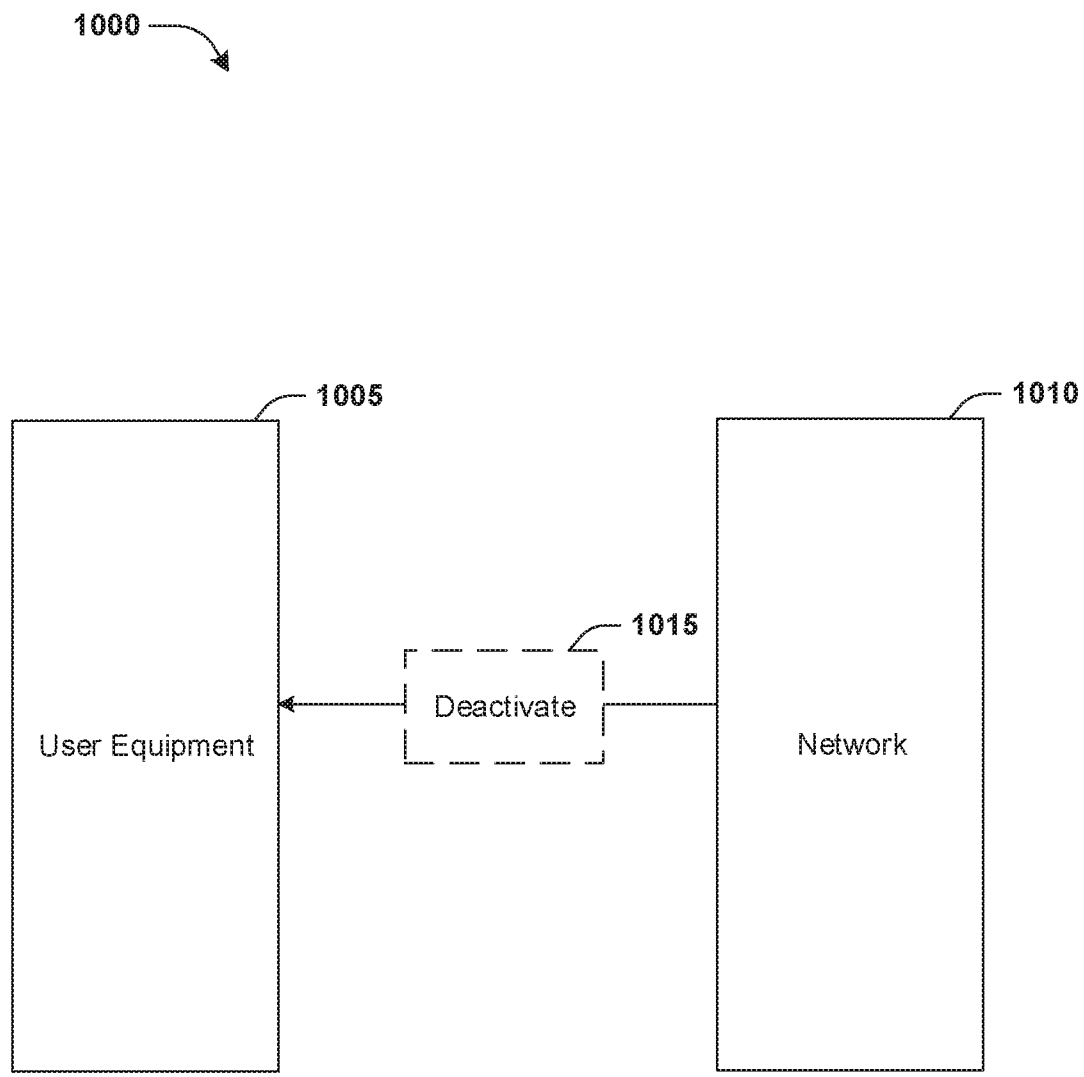
FIG. 10 is a diagram illustrating an example system for facilitating transmission of a deactivation instruction.

FIG. 10 illustrates an example of a system 1000 for facilitating transmission of a deactivation instruction from a first wireless node 1010 to a second wireless node 1005. The first wireless node 1010 may be a network and/or BS and the second wireless node 1005 may be a UE. In some examples, the first wireless node 1010 may generate a deactivation instruction 1015 corresponding to an uplink carrier. The uplink carrier may be comprised within a (e.g., primary and/or secondary) cell.

The uplink carrier may not (e.g., and/or may cease to) be used for data transmission based upon a service demand of the second wireless node 1005 and/or a location of the second wireless node 1005. Accordingly, the deactivation instruction 1015 may be configured to trigger deactivation of the uplink carrier. Alternatively and/or additionally, a plurality of uplink carriers (e.g., some, all, etc.) of the (e.g., primary and/or secondary) cell may not (e.g., and/or may cease to) be used for data transmission based upon the service demand of the second wireless node 1005 and/or the location of the second wireless node 1005. Accordingly, the deactivation instruction 1015 may be configured to trigger deactivation of the plurality of uplink carriers. In some examples, the deactivation instruction 1015 comprises a PDCCH message. Alternatively and/or additionally, the deactivation instruction 1015 comprises a MAC CE message. Alternatively and/or additionally, the deactivation instruction 1015 comprises an RRC message.

In some examples, the first wireless node 1010 may transmit the deactivation instruction 1015 to the second wireless node 1005. Accordingly, the second wireless node 1005 may receive the deactivation instruction 1015. The second wireless node 1005 may deactivate (e.g., cease accessing, cease using, cease communicating via, etc.) (e.g., and/or release information of) the uplink carrier based upon (e.g., and/or responsive to receiving) the deactivation instruction 1015.

Figure 11:
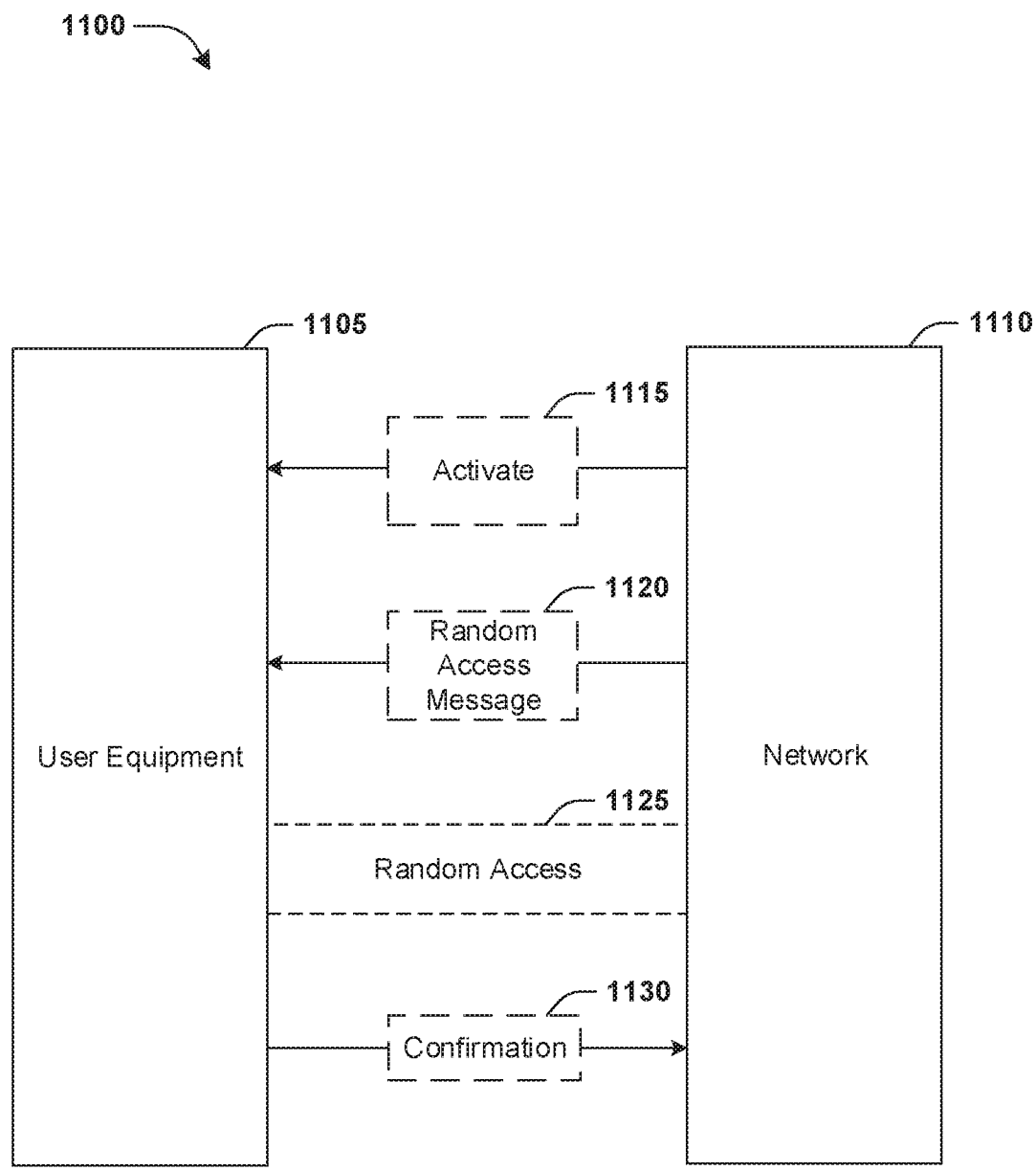
FIG. 11 is a diagram illustrating an example system for facilitating transmission of an activation instruction.

FIG. 11 illustrates an example of a system 1100 for facilitating transmission of an activation instruction from a first wireless node 1110 to a second wireless node 1105. The first wireless node 1110 may be a network and/or BS and the second wireless node 1105 may be a UE. In some examples, the first wireless node 1110 may generate an activation instruction 1115 corresponding to an uplink carrier.

The uplink carrier may be used for data transmission based upon a service demand of the second wireless node 1105 and/or a location of the second wireless node 1105. Accordingly, the activation instruction 1115 may be configured to trigger activation of the uplink carrier. In some examples, the activation instruction 1115 comprises a PDCCH message. Alternatively and/or additionally, the activation instruction 1115 comprises a MAC CE message. Alternatively and/or additionally, the activation instruction 1115 comprises an RRC message.

In some examples, the first wireless node 1110 may transmit the activation instruction 1115 to the second wireless node 1105. Accordingly, the second wireless node 1105 may activate (e.g., access, identify, use, communicate via, etc.) the uplink carrier based upon (e.g., and/or responsive to receiving) the activation instruction 1115.

In some examples, the uplink carrier may not be synchronized with one or more other uplink carriers within one or more (e.g., primary and/or secondary) cells. Thus, the uplink carrier may be associated with a TAG that is different from a TAG of the one or more other uplink carriers. Accordingly, the first wireless node 1110 may generate a message 1120 (e.g., an indication) to trigger a random access 1125 to the uplink carrier. The first wireless node 1110 may (e.g., then) transmit the message 1120 to the second wireless node 1105. The first wireless node 1110 may transmit the message 1120 to the second wireless node 1105 based upon (e.g., concurrently with, following, etc.) a time when the second wireless node 1105 activates (e.g., accesses, identifies, uses, communicates via, etc.) the uplink carrier (e.g., for data transmission). The second wireless node 1105 may (e.g., then) initiate the random access 1125 to the uplink carrier based upon (e.g., and/or responsive to receiving) the message 1120. In some examples, the second wireless node 1105 may generate a confirmation message 1130 based upon the random access 1125 to the uplink carrier. Alternatively and/or additionally, the second wireless node 1105 may generate the confirmation message 1130 based upon (e.g., and/or responsive to) completing the random access 1125 to the uplink carrier. The second wireless node 1105 may transmit the confirmation message 1130 to the first wireless node 1110.

Figure 12:
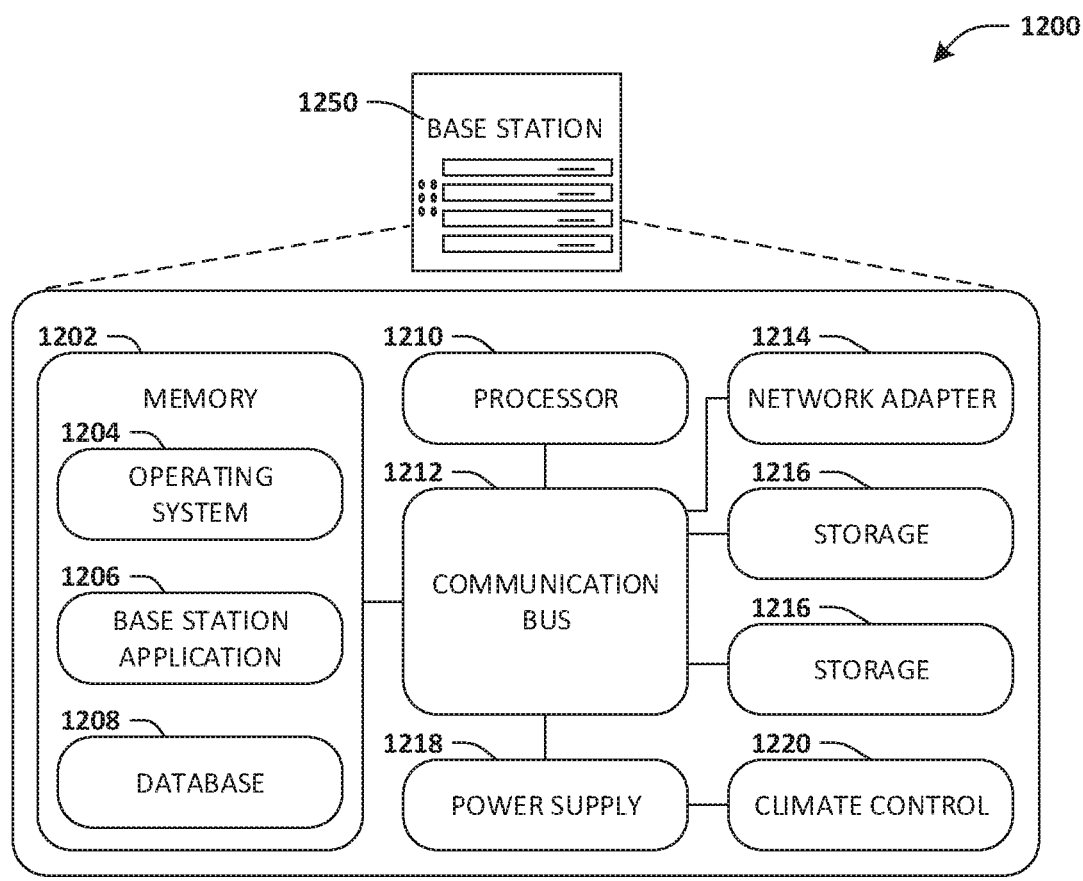
FIG. 12 is an illustration of a scenario involving an example configuration of a base station (BS) that may utilize and/or implement at least a portion of the techniques presented herein.

FIG. 12 presents a schematic architecture diagram 1200 of a base station 1250 (e.g., a node) that may utilize at least a portion of the techniques provided herein. Such a base station 1250 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 1250 may connect one or more user equipment (UE) to a (e.g., wireless) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA13000, Global System for Mobile Communications (GSM), Evolved UTRA (E-UTRA), IEEE 802.11, IEEE 802.16, IEEE 802.20, Flash-OFDM, etc. The base station 1250 and/or the network may communicate using a standard, such as Long-Term Evolution (LTE).

The base station 1250 may comprise one or more (e.g., hardware) processors 1210 that process instructions. The one or more processors 1210 may optionally include a plurality of cores; one or more coprocessors, such as a mathematics coprocessor or an integrated graphical processing unit (GPU); and/or one or more layers of local cache memory. The base station 1250 may comprise memory 1202 storing various forms of applications, such as an operating system 1204; one or more base station applications 1206; and/or various forms of data, such as a database 1208 and/or a file system, etc. The base station 1250 may comprise a variety of peripheral components, such as a wired and/or wireless network adapter 1214 connectible to a local area network and/or wide area network; one or more storage components 1216, such as a hard disk drive, a solid-state storage device (SSD), a flash memory device, and/or a magnetic and/or optical disk reader; and/or other peripheral components.

The base station 1250 may comprise a mainboard featuring one or more communication buses 1212 that interconnect the processor 1210, the memory 1202, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1212 may interconnect the base station 1250 with at least one other server. Other components that may optionally be included with the base station 1250 (though not shown in the schematic diagram 1200 of FIG. 12) include a display; a display adapter, such as a graphical processing unit (GPU); input peripherals, such as a keyboard and/or mouse; and/or a flash memory device that may store a basic input/output system (BIOS) routine that facilitates booting the base station 1250 to a state of readiness, etc.

The base station 1250 may operate in various physical enclosures, such as a desktop or tower, and/or may be integrated with a display as an "all-in-one" device. The base station 1250 may be mounted horizontally and/or in a cabinet or rack, and/or may simply comprise an interconnected set of components. The base station 1250 may comprise a dedicated and/or shared power supply 1218 that supplies and/or regulates power for the other components. The base station 1250 may provide power to and/or receive power from another base station and/or server and/or other devices. The base station 1250 may comprise a shared and/or dedicated climate control unit 1220 that regulates climate properties, such as temperature, humidity, and/or airflow. Many such base stations 1250 may be configured and/or adapted to utilize at least a portion of the techniques presented herein.

Figure 13:
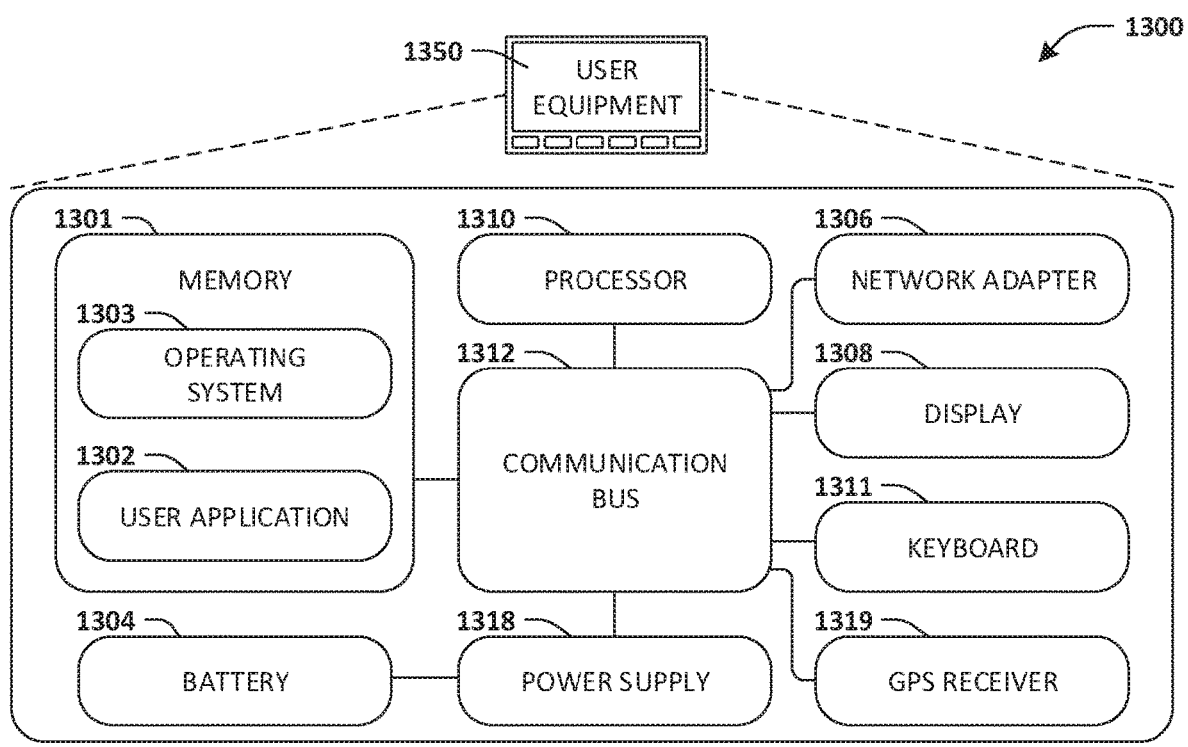
FIG. 13 is an illustration of a scenario involving an example configuration of a user equipment (UE) that may utilize and/or implement at least a portion of the techniques presented herein.

FIG. 13 presents a schematic architecture diagram 1300 of a user equipment (UE) 1350 (e.g., a node) whereupon at least a portion of the techniques presented herein may be implemented. Such a UE 1350 may vary widely in configuration and/or capabilities, in order to provide a variety of functionality to a user. The UE 1350 may be provided in a variety of form factors, such as a mobile phone (e.g., a smartphone); a desktop or tower workstation; an "all-in-one" device integrated with a display 1308; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 1350 may serve the user in a variety of roles, such as a telephone, a workstation, kiosk, media player, gaming device, and/or appliance.

The UE 1350 may comprise one or more (e.g., hardware) processors 1310 that process instructions. The one or more processors 1310 may optionally include a plurality of cores; one or more coprocessors, such as a mathematics coprocessor or an integrated graphical processing unit (GPU); and/or one or more layers of local cache memory. The UE 1350 may comprise memory 1301 storing various forms of applications, such as an operating system 1303; one or more user applications 1302, such as document applications, media applications, file and/or data access applications, communication applications, such as web browsers and/or email clients, utilities, and/or games; and/or drivers for various peripherals. The UE 1350 may comprise a variety of peripheral components, such as a wired and/or wireless network adapter 1306 connectible to a local area network and/or wide area network; one or more output components, such as a display 1308 coupled with a display adapter (optionally including a graphical processing unit (GPU)), a sound adapter coupled with a speaker, and/or a printer; input devices for receiving input from the user, such as a keyboard 1311, a mouse, a microphone, a camera, and/or a touch-sensitive component of the display 1308; and/or environmental sensors, such as a GPS receiver 1319 that detects the location, velocity, and/or acceleration of the UE 1350, a compass, accelerometer, and/or gyroscope that detects a physical orientation of the UE 1350. Other components that may optionally be included with the UE 1350 (though not shown in the schematic architecture diagram 1300 of FIG. 13) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 1350 to a state of readiness; and/or a climate control unit that regulates climate properties, such as temperature, humidity, and airflow, etc.

The UE 1350 may comprise a mainboard featuring one or more communication buses 1312 that interconnect the processor 1310, the memory 1301, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 1350 may comprise a dedicated and/or shared power supply 1318 that supplies and/or regulates power for other components, and/or a battery 1304 that stores power for use while the UE 1350 is not connected to a power source via the power supply 1318. The UE 1350 may provide power to and/or receive power from other client devices.

Figure 14:
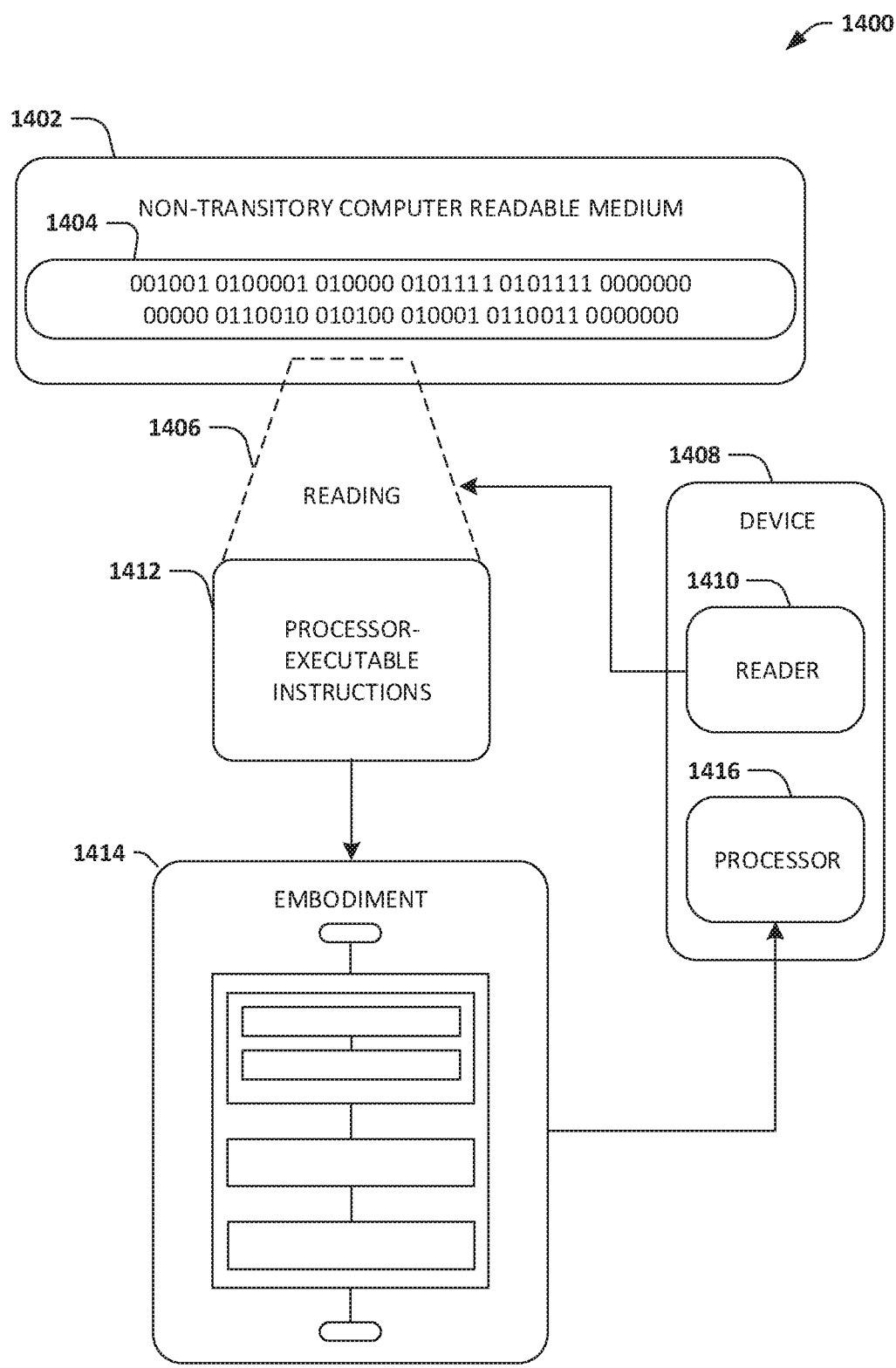
FIG. 14 is an illustration of a scenario featuring an example non-transitory computer readable medium in accordance with one or more of the provisions set forth herein.

FIG. 14 is an illustration of a scenario 1400 involving an example non-transitory computer readable medium 1402. The non-transitory computer readable medium 1402 may comprise processor-executable instructions 1412 that when executed by a processor 1416 cause performance (e.g., by the processor 1416) of at least some of the provisions herein. The non-transitory computer readable medium 1402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), and/or floppy disk). The example non-transitory computer readable medium 1402 stores computer-readable data 1404 that, when subjected to reading 1406 by a reader 1410 of a device 1408 (e.g., a read head of a hard disk drive, or a read operation invoked on a solid-state storage device), express the processor-executable instructions 1412. In some embodiments, the processor-executable instructions 1412, when executed, cause performance of operations, such as at least some of the example method 100A of FIG. 1A, the example method 100B of FIG. 1B, the example method 100C of FIG. 100C, the example method 100D of FIG. 1D, the example method 100E of FIG. 1E and/or the example method 100F of FIG. 1F, for example. In some embodiments, the processor-executable instructions 1412 are configured to cause implementation of a system and/or scenario, such as at least some of the example system 200 of FIG. 2, the example system 300 of FIG. 3, the example system 400A of FIG. 4A, the example system 400B of FIG. 4B, the example system 500 of FIG. 5, the example system 600 of FIG. 6, the example system 700A of FIG. 7A, the example system 700B of FIG. 7B, the example system 800A of FIG. 8A, the example system 800B of FIG. 8B, the example system 900 of FIG. 9, the example system 1000 of FIG. 10 and/or the example system 1100 of FIG. 11, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wireless communication method, comprising:
   transmitting, by a network node to a user equipment, a message that triggers the user equipment to perform, during a handover, a random access to an uplink carrier from a plurality of uplink carriers of a cell,
      wherein a first number of downlink carriers of the cell is less than a second number of the plurality of uplink carriers of the cell,
      wherein the message includes a Random Access Channel (RACH) resource of the uplink carrier of the cell and an uplink frequency of the uplink carrier of the cell,
      wherein the message is included in a configuration related to the handover,
      wherein the configuration includes information related to the plurality of uplink carriers of the cell,
      wherein the message is transmitted in response to the uplink carrier that is not synchronized with another uplink carrier of another cell,
      wherein the uplink carrier is associated with a timing access group (TAG) that is different from that of the another uplink carrier of the another cell, and
      wherein the network node transmits the message concurrently with a time when the user equipment is configured to identify the uplink carrier.

2. The method of claim 1, wherein the message includes a radio resource control (RRC) message.

3. The method of claim 1, wherein the network node comprises a base station.

4. The method of claim 1, wherein the cell includes a primary cell.

5. A wireless communication method, comprising:
   receiving, by a user equipment from a network node, a message that triggers the user equipment to perform, during a handover, a random access to an uplink carrier from a plurality of uplink carriers of a cell,
      wherein a first number of downlink carriers of the cell is less than a second number of the plurality of uplink carriers of the cell,
      wherein the message includes a Random Access Channel (RACH) resource of the uplink carrier of the cell and an uplink frequency of the uplink carrier of the cell,
      wherein the message is included in a configuration related to the handover,
      wherein the configuration includes information related to the plurality of uplink carriers of the cell,
      wherein the message is received in response to the uplink carrier that is not synchronized with another uplink carrier of another cell,
      wherein the uplink carrier is associated with a timing access group (TAG) that is different from that of the another uplink carrier of the another cell, and
      wherein the user equipment receives the message concurrently with a time when the user equipment is configured to identify the uplink carrier; and
   performing, during the handover, the random access to the uplink carrier based on the message.

6. The method of claim 5, wherein the message includes a radio resource control (RRC) message.

7. The method of claim 5, wherein the user equipment comprises a mobile phone, a laptop, a desktop, a headset, a wristwatch, or a vehicle.

8. The method of claim 5, wherein the cell includes a primary cell.

9. A communication device comprising a processor and a memory, the communication device configured to:
   transmit, to a user equipment, a message that triggers the user equipment to perform, during a handover, a random access to an uplink carrier from a plurality of uplink carriers of a cell,
      wherein a first number of downlink carriers of the cell is less than a second number of the plurality of uplink carriers of the cell,
      wherein the message includes a Random Access Channel (RACH) resource of the uplink carrier of the cell and an uplink frequency of the uplink carrier of the cell,
      wherein the message is included in a configuration related to the handover,
      wherein the configuration includes information related to the plurality of uplink carriers of the cell,
      wherein the message is transmitted in response to the uplink carrier that is not synchronized with another uplink carrier of another cell,
      wherein the uplink carrier is associated with a timing access group (TAG) that is different from that of the another uplink carrier of the another cell, and
      wherein the message is transmitted concurrently with a time when the user equipment is configured to identify the uplink carrier.

10. The communication device of claim 9, wherein the message includes a radio resource control (RRC) message.

11. The communication device of claim 9, wherein the communication device comprises a base station.

12. The communication device of claim 9, wherein the cell includes a primary cell.

13. A communication device comprising a processor and a memory, the communication device configured to:
- receive, from a network node, a message that triggers a user equipment to perform, during a handover, a random access to an uplink carrier from a plurality of uplink carriers of a cell,
  - wherein a first number of downlink carriers of the cell is less than a second number of the plurality of uplink carriers of the cell,
  - wherein the message includes a Random Access Channel (RACH) resource of the uplink carrier of the cell and an uplink frequency of the uplink carrier of the cell,
  - wherein the message is included in a configuration related to the handover,
  - wherein the configuration includes information related to the plurality of uplink carriers of the cell,
  - wherein the message is received in response to the uplink carrier that is not synchronized with another uplink carrier of another cell,
  - wherein the uplink carrier is associated with a timing access group (TAG) that is different from that of the another uplink carrier of the another cell, and
  - wherein the user equipment receives the message concurrently with a time when the user equipment is configured to identify the uplink carrier; and
- perform, during the handover, the random access to the uplink carrier based on the message.

14. The communication device of claim 13, wherein the message includes a radio resource control (RRC) message.

15. The communication device of claim 13, wherein the communication device comprises a mobile phone, a laptop, a desktop, a headset, a wristwatch, or a vehicle, and wherein the network node comprises a base station.

16. The communication device of claim 13, wherein the cell includes a primary cell.

* * * * *